(12) United States Patent
Hayase

(10) Patent No.: US 10,193,460 B2
(45) Date of Patent: Jan. 29, 2019

(54) DC/DC CONVERTER HAVING CURRENT DIVERSION CIRCUIT

(71) Applicant: Mitsubishi Electric Corporation, Tokyo (JP)

(72) Inventor: Kei Hayase, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/525,661

(22) PCT Filed: Aug. 26, 2015

(86) PCT No.: PCT/JP2015/074031
§ 371 (c)(1),
(2) Date: May 10, 2017

(87) PCT Pub. No.: WO2016/117157
PCT Pub. Date: Jul. 28, 2016

(65) Prior Publication Data
US 2017/0331385 A1 Nov. 16, 2017

(30) Foreign Application Priority Data
Jan. 20, 2015 (JP) ................................ 2015-008369

(51) Int. Cl.
*H02M 3/28* (2006.01)
*H02M 3/335* (2006.01)
(Continued)

(52) U.S. Cl.
CPC ......... *H02M 3/33569* (2013.01); *H02M 1/08* (2013.01); *H02M 3/28* (2013.01);
(Continued)

(58) Field of Classification Search
CPC ............... H02M 3/33569; H02M 1/08; H02M 2001/0058; H02M 2001/346; H02M 3/28
See application file for complete search history.

(56) References Cited

U.S. PATENT DOCUMENTS

| 5,936,853 A | 8/1999 | Mweene |
| 2008/0043495 A1 | 2/2008 | Jungreis |
| 2012/0147629 A1 | 6/2012 | Mao et al. |

FOREIGN PATENT DOCUMENTS

| JP | 06-014544 A | 1/1994 |
| JP | 11-098836 A | 4/1999 |

(Continued)

OTHER PUBLICATIONS

International Search Report for PCT/JP2015/074031 dated Oct. 6, 2015.

*Primary Examiner* — Kyle J Moody
*Assistant Examiner* — Jye-June Lee
(74) *Attorney, Agent, or Firm* — Sughrue Mion, PLLC; Richard C. Turner

(57) ABSTRACT

This invention is concerning a secondary side reflux circuit having a series circuit that is formed by connecting a secondary side reflux diode and a reflux reactor in series, the secondary side reflux circuit being provided on a secondary side of a DC/DC converter that subjects DC power from a DC power supply to DC/DC conversion and outputs the converted power to a load connected in series to a smoothing reactor connected to an output side of a rectifier circuit having a plurality of rectifying semiconductor switching elements. During a period in which a voltage from the DC power supply is not applied to a primary side of a transformer, the secondary side reflux circuit diverts a load current flowing through a load so as to return the load current to the load.

28 Claims, 23 Drawing Sheets

(51) Int. Cl.
*H02M 1/08* (2006.01)
*H02M 1/00* (2006.01)
*H02M 1/34* (2007.01)

(52) U.S. Cl.
CPC ............... *H02M 2001/0058* (2013.01); *H02M 2001/346* (2013.01)

(56) References Cited

FOREIGN PATENT DOCUMENTS

| | | | |
|---|---|---|---|
| JP | 2008-187801 A | | 8/2008 |
| JP | 2013-074767 A | | 4/2013 |
| JP | 2013-207950 A | | 10/2013 |
| JP | 2013-223361 A | | 10/2013 |
| JP | 2013223361 A | * | 10/2013 |
| JP | 2014-050166 A | | 3/2014 |

* cited by examiner

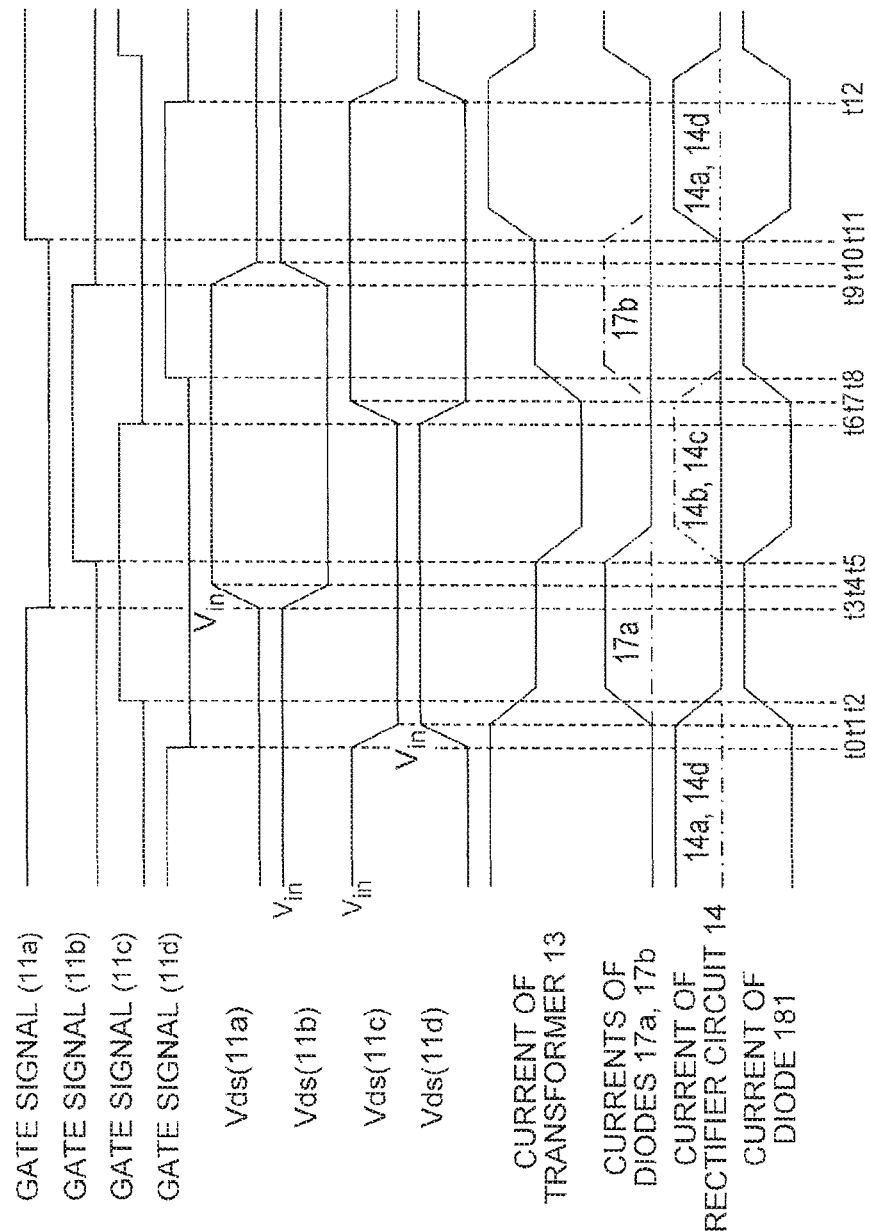

DC/DC CONVERTER HAVING CURRENT DIVERSION CIRCUIT

CROSS REFERENCE TO RELATED APPLICATIONS

This application is a National Stage of International Application No. PCT/JP2015/074031 filed Aug. 26, 2015, claiming priority based on Japanese Patent Application No. 2015-008369 filed Jan. 20, 2015, the contents of all of which are incorporated herein by reference in their entirety.

TECHNICAL FIELD

This invention relates to a DC/DC converter in which a primary side and a secondary side are insulated by a transformer, and more particularly to a DC/DC converter having a function for suppressing a surge generated due to the effect of a recovery current.

BACKGROUND ART

In a conventional power conversion device, positive and negative rectangular wave-shaped pulse trains transmitted from a primary side to a secondary side via a transformer are converted into rectangular wave-shaped pulse trains of an identical polarity by being rectified using a rectifier circuit. At this time, a surge voltage is generated on the secondary side of the transformer due to the effect of a recovery current generated when a diode of the rectifier circuit is switched OFF. Therefore, the power conversion device is provided with a snubber circuit in order to suppress this surge voltage.

By providing the snubber circuit, the surge voltage generated on the secondary side of the transformer is clamped to a voltage of a capacitor by a diode of the snubber circuit. As a result, the surge voltage is stored in the capacitor, and therefore respective elements of the rectifier circuit can be protected from an overvoltage (see PTL 1, for example).

CITATION LIST

Patent Literature

[PTL 1] Japanese Patent Application Publication No. 2013-74767
[PTL 2] Japanese Patent Application Publication No. H6-14544
[PTL 3] Japanese Patent Application Publication No. 2013-207950

SUMMARY OF INVENTION

Technical Problem

However, the prior art includes the following problems.

In the prior art described in PTL 1, one end of a resistor provided in the snubber circuit is connected to an output side of the rectifier via a diode, and another end is connected to a load. Therefore, the capacitor voltage that clamps the surge voltage is highly dependent on a voltage of the load and a resistance value of the snubber circuit. More specifically, the clamping voltage is high when the load voltage is high and low when the load voltage is low. Further, the clamping voltage is high when the resistance value of the snubber circuit is large and low when the resistance value of the snubber circuit is small.

Therefore, to ensure that the surge voltage is absorbed efficiently when the load voltage is high, the resistance value of the snubber circuit must be reduced so that the clamping voltage does not increase. By reducing the resistance value of the snubber circuit, however, the clamping voltage decreases when the load voltage is low, and therefore, although the surge voltage can be absorbed efficiently, loss generated by the resistor of the snubber circuit increases.

Here, the clamping voltage never falls below a secondary side voltage of the transformer. Further, when the secondary side voltage of the transformer is high and the load voltage is low, the loss generated by the resistor of the snubber circuit becomes particularly large. Note that the secondary side voltage of the transformer is dependent on a maximum value of the load voltage.

In other words, in an application where the load voltage varies by a large amount, a problem exists in that when the resistance value of the snubber circuit is reduced while the load voltage is at the maximum to ensure that a surge voltage is absorbed efficiently, the load voltage decreases, leading to an increase in the loss generated by the resistor of the snubber circuit. When the loss generated by the resistor of the snubber circuit increases in this manner, the efficiency of the power conversion device cannot easily be improved, and due to heat-related problems in the resistor, a large structure is required, making it difficult to reduce the size of the power conversion device.

This invention has been designed to solve the problems described above, and an object thereof is to obtain a DC/DC converter with which a device can be improved in efficiency and reduced in size while suppressing surge generation due to the effect of a recovery current.

Solution to Problem

A DC/DC converter according to this invention includes: an inverter circuit including a plurality of inverter semiconductor switching elements subjected to switch control using a soft switching method, and converting DC power from a DC power supply connected to an input side thereof into AC power; a rectifier circuit including a plurality of rectifying semiconductor switching elements; a transformer connected on a primary side thereof to an output side of the inverter circuit, and on a secondary side thereof to an input side of the rectifier circuit; a resonance reactor inserted between an output side of the inverter circuit and the primary side of the transformer; and a smoothing reactor connected to an output side of the rectifier circuit, the DC power being subjected to DC/DC conversion by the DC/DC converter and output to a load connected in series to the smoothing reactor, the DC/DC converter further including: a secondary side reflux circuit connected to the output side of the rectifier circuit in order to divert a load current flowing through the load during a period in which a voltage from the DC power supply is not applied to the primary side of the transformer; a first primary side reflux semiconductor switching element connected at one end to a connection point between the resonance reactor and the primary side of the transformer and at another end to one end of the DC power supply; and a second primary side reflux semiconductor switching element connected at one end to another end of the DC power supply and at another end to the connection point between the resonance reactor and the primary side of the transformer, wherein a series circuit formed by connecting the smoothing reactor and the load in series is connected to the output side of the rectifier circuit, the secondary side reflux circuit is positioned between the output side of the rectifier circuit and the series circuit and connected in parallel to the series circuit, and either the first primary side reflux semiconductor switching element or the second primary side reflux semiconductor switching element diverts a current flowing through the resonance reactor during the period in which the voltage from the DC power supply is not applied to the primary side of the transformer.

Advantageous Effects of Invention

According to this invention, the secondary side reflux circuit that returns the load current flowing through the load to the load by diverting the load current during the period in which the voltage of the DC power supply is not applied to the primary side of the transformer is provided on the secondary side of the DC/DC converter. As a result, a DC/DC converter with which a device can be improved in efficiency and reduced in size while suppressing surge generation due to the effect of a recovery current can be obtained.

BRIEF DESCRIPTION OF DRAWINGS

FIG. 2 is a waveform diagram showing variation in parameters of respective parts of the DC/DC converter according to the first embodiment of this invention in order to illustrate an operation of the DC/DC converter.

DESCRIPTION OF EMBODIMENTS

Figure 1:
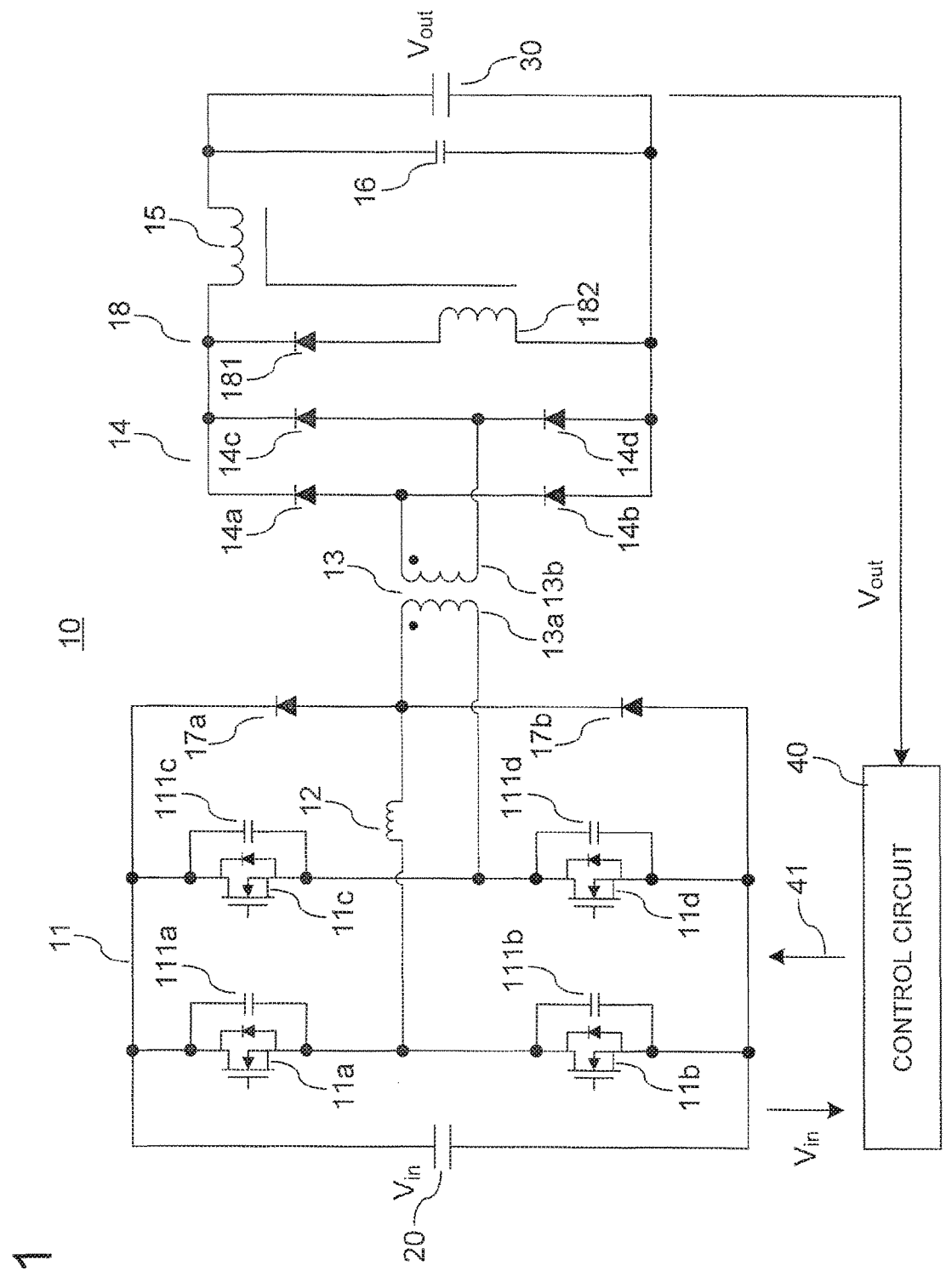
FIG. 1 is a circuit diagram showing a configuration of a DC/DC converter according to a first embodiment of this invention.

Preferred embodiments of a DC/DC converter according to this invention will be described below using the drawings. Note that in the description of the drawings, identical reference numerals have been allocated to identical or corresponding parts, and duplicate description thereof has been omitted.

First Embodiment

First, effects obtained from a configuration of a DC/DC converter according to a first embodiment will be described. As noted above, with the DC/DC converter according to the first embodiment, a device can be improved in efficiency and reduced in size while suppressing surge generation due to the effect of a recovery current.

Further, with the DC/DC converter according to the first embodiment, other effects can be obtained in addition to the effects described above. These other effects will now be described by means of comparison with the prior art described in PTL 2 and PTL 3.

Here, in the prior art described in PTL 2 and PTL 3, a surge generated due to the effect of a recovery current is suppressed by reducing a reflux current flowing through a rectifier circuit.

However, when the prior art described in PTL 2 and PTL 3 is applied to a DC/DC converter driven using a soft switching method (more specifically, a phase shift soft switching method), the following problems occur.

At the same time as the reflux current flowing through the rectifier circuit decreases, a reflux current flowing through the primary side of the transformer also decreases. When the reflux current flowing through the primary side decreases, a voltage of a capacitor connected in parallel with a primary side semiconductor switching element is less likely to reach zero, and therefore the feasibility of the ZVS (Zero Volt Switching) cannot be secured. As a result, switching loss in the primary side semiconductor switching element increases.

In the DC/DC converter according to the first embodiment, on the other hand, a secondary side reflux circuit that returns a load current flowing through a load to the load by diverting the load current during a period in which a voltage of a DC power supply is not applied to a primary side of a transformer is provided on a secondary side of the DC/DC converter. Further, a semiconductor switching element that diverts a current flowing through a resonance reactor is provided on a primary side.

By means of this configuration, a reflux current flowing through a rectifier circuit can be reduced, and as a result, surge generation due to the effect of a recovery current can be suppressed. Moreover, at the same time, a reduction in the reflux current flowing through the primary side can be suppressed even when the DC/DC converter is driven using a soft switching method, and as a result, ZVS feasibility can be secured.

In other words, with the DC/DC converter according to the first embodiment, surge generation due to the effect of a recovery current can be suppressed, and ZVS feasibility can be secured while implementing driving using a soft switching method.

Next, a DC/DC converter 10 according to the first embodiment will be described with reference to FIG. 1. FIG. 1 is a circuit diagram showing a configuration of the DC/DC converter 10 according to the first embodiment of this invention. Note that FIG. 1 also shows a DC power supply 20 connected to a primary side of the DC/DC converter 10, a load 30 (a battery or the like, for example) connected to a secondary side of the DC/DC converter 10, and a control circuit 40 for controlling an operation of the DC/DC converter 10.

In FIG. 1, the DC/DC converter 10 includes an inverter circuit 11, a resonance reactor 12, an insulated transformer 13, a rectifier circuit 14, a smoothing reactor 15, a smoothing capacitor 16, a primary side reflux diode 17a, a primary side reflux diode 17b, and a secondary side reflux circuit 18.

The inverter circuit 11 functions as an inverter that converts an input DC voltage Vin from the DC power supply 20 into an AC voltage and outputs the converted AC voltage to the transformer 13, and therefore corresponds to a so-called single phase inverter. Further, the inverter circuit 11 is connected to a transformer primary side 13a of the transformer 13. Note that here, the transformer primary side 13a denotes a primary winding side of the transformer 13.

More specifically, the inverter circuit 11 includes a plurality of inverter semiconductor switching elements 11a to 11d. Further, each of the inverter semiconductor switching elements 11a to 11d is configured to include a MOSFET (Metal Oxide Semiconductor Field Effect Transistor) in which a body diode is installed between a source and a drain. Furthermore, the inverter circuit 11 employs a full bridge type circuit configuration using the inverter semiconductor switching elements 11a to 11d. Note that hereafter, the inverter semiconductor switching elements 11a to 11d will be referred to as the switching elements 11a to 11d.

Resonance capacitors 111a to 111d are connected in parallel respectively to the switching elements 11a to 11d. The resonance capacitors 111a to 111d reduce switching loss in the MOSFETs of the switching elements 11a to 11d.

The resonance reactor 12 is inserted between an output side of the inverter circuit 11 and the transformer primary side 13a in order to reduce switching loss in the MOSFETs of the switching elements 11a to 11d.

The rectifier circuit 14 applies a DC voltage obtained by converting an AC voltage input therein from the transformer 13 to the load 30. A voltage of the load 30 at this time is set as an output DC voltage Vout. Further, the rectifier circuit 14 is connected to a transformer secondary side 13b of the transformer 13. Note that here, the transformer secondary side 13b denotes a secondary winding side of the transformer 13.

More specifically, the rectifier circuit 14 includes a plurality of diodes 14a to 14d functioning as rectifying elements. Further, the rectifier circuit 14 employs a full bridge type circuit configuration using the diodes 14a to 14d.

The smoothing reactor 15 and the smoothing capacitor 16 are connected to an output side of the rectifier circuit 14 in order to smooth an output current from the rectifier circuit 14.

The primary side reflux diode 17a and the primary side reflux diode 17b are connected to each other in series in order to divert a current flowing through the resonance reactor 12. In other words, the current flowing through the resonance reactor 12 is diverted by being caused to flow through either the primary side reflux diode 17a or the primary side reflux diode 17b.

In the primary side reflux diode 17a, an anode is connected to a connection point between the resonance reactor 12 and the transformer primary side 13a, and a cathode is connected to a positive side terminal of the DC power supply 20. Further, in the primary side reflux diode 17b, an anode is connected to a negative side terminal of the DC power supply 20, and a cathode is connected to the connection point between the resonance reactor 12 and the transformer primary side 13a.

The secondary side reflux circuit 18 includes a series circuit in which a secondary side reflux diode 181 and a reflux reactor 182 are connected in series. The secondary side reflux diode 181 returns a load current flowing through the load 30 to the load 30 by diverting the load current. The reflux reactor 182 is provided to ensure that the load current flows reliably through the secondary side reflux diode 181.

In the secondary side reflux diode 181, an anode is connected to one end of the reflux reactor 182, and a cathode is connected to a positive side output terminal of the rectifier circuit 14. The other end of the reflux reactor 182 is connected to a negative side output terminal of the rectifier circuit 14. Further, the reflux reactor 182 is magnetically coupled to the smoothing reactor 15 so that a current flows therethrough in an identical direction to a current flowing through the smoothing reactor 15.

The control circuit 40 is disposed on the exterior of the main circuit, and detection results obtained in relation to the input DC voltage Vin and the output DC voltage Vout are input into the control circuit 40. The control circuit 40 implements switch control on the respective switching elements 11a to 11d of the inverter circuit 11 using a soft switching method so that the output DC voltage Vout input therein reaches a target voltage. More specifically, the control circuit 40 controls respective ON duties (in other words, ON periods) of the switching elements 11a to 11d by outputting gate signals 41 respectively to the switching elements 11a to 11d. Note that a specific control example of the switch control implemented on the respective switching elements 11a to 11d using a soft switching method will be described below with reference to FIG. 2.

Here, the switching elements 11a to 11d are not limited to MOSFETs, and may be self-arc-extinguishing semiconductor switching elements such as IGBTs (Insulated Gate Bipolar Transistors) in which diodes are connected in anti-parallel. Further, the resonance capacitors 111a to 111d may be configured to use the parasitic capacitance of the switching elements 11a to 11d.

Note that in the first embodiment, a case in which the diodes 14a to 14d, the primary side reflux diodes 17a, 17b, the secondary side reflux diode 181, and a semiconductor switching element referred to as a diode 19, to be described below, are used will be described as an example, but other semiconductor switching elements such as transistor elements may be used instead.

Next, an operation of the DC/DC converter 10 according to the first embodiment will be described with reference to FIG. 2. FIG. 2 is a waveform diagram showing variation in parameters of respective parts of the DC/DC converter 10 according to the first embodiment of this invention in order to illustrate an operation of the DC/DC converter 10.

FIG. 2 is a timing chart showing the gate signals 41 output by the control circuit 40 to the respective switching elements 11a to 11d of the inverter circuit 11. FIG. 2 shows variation in the parameters of respective parts of the DC/DC converter 10 as waveforms in a case where switch control is implemented on the switching elements 11a to 11d using a soft switching method in accordance with the gate signals 41.

More specifically, FIG. 2 shows variation in respective drain-source voltages (Vds) of the switching elements 11a to 11d, and currents flowing respectively through the transformer 13, the primary side reflux diodes 17a, 17b, the diodes 14a to 14d of the rectifier circuit 14, and the secondary side reflux diode 181.

Note that in FIG. 2, the currents flowing through the primary side reflux diode 17b and the diodes 14b, 14c are indicated by dot-dash lines. Further, in the inverter circuit 11, the respective duties of the switching elements 11a, 11b are close to 50% such that the switching elements 11a, 11b are switched ON alternately while providing periods in which both are switched OFF. Likewise, the respective duties of the switching elements 11c, 11d are close to 50% such that the switching elements 11c, 11d are switched ON alternately while providing periods in which both are switched OFF. Furthermore, output control is executed by setting a phase difference between the switching elements 11a, 11b and the switching elements 11c, 11d to be variable within a range extending from 0° to 180°.

Next, currents flowing through the circuits at respective timings when switch control is implemented on the switching elements 11a to 11d in accordance with the gate signals 41, as shown in FIG. 2, will be described with reference to FIGS. 3A to 3G. FIGS. 3A to 3G are current path diagrams illustrating an operation of the DC/DC converter 10 according to the first embodiment of this invention.

Figure 3A:
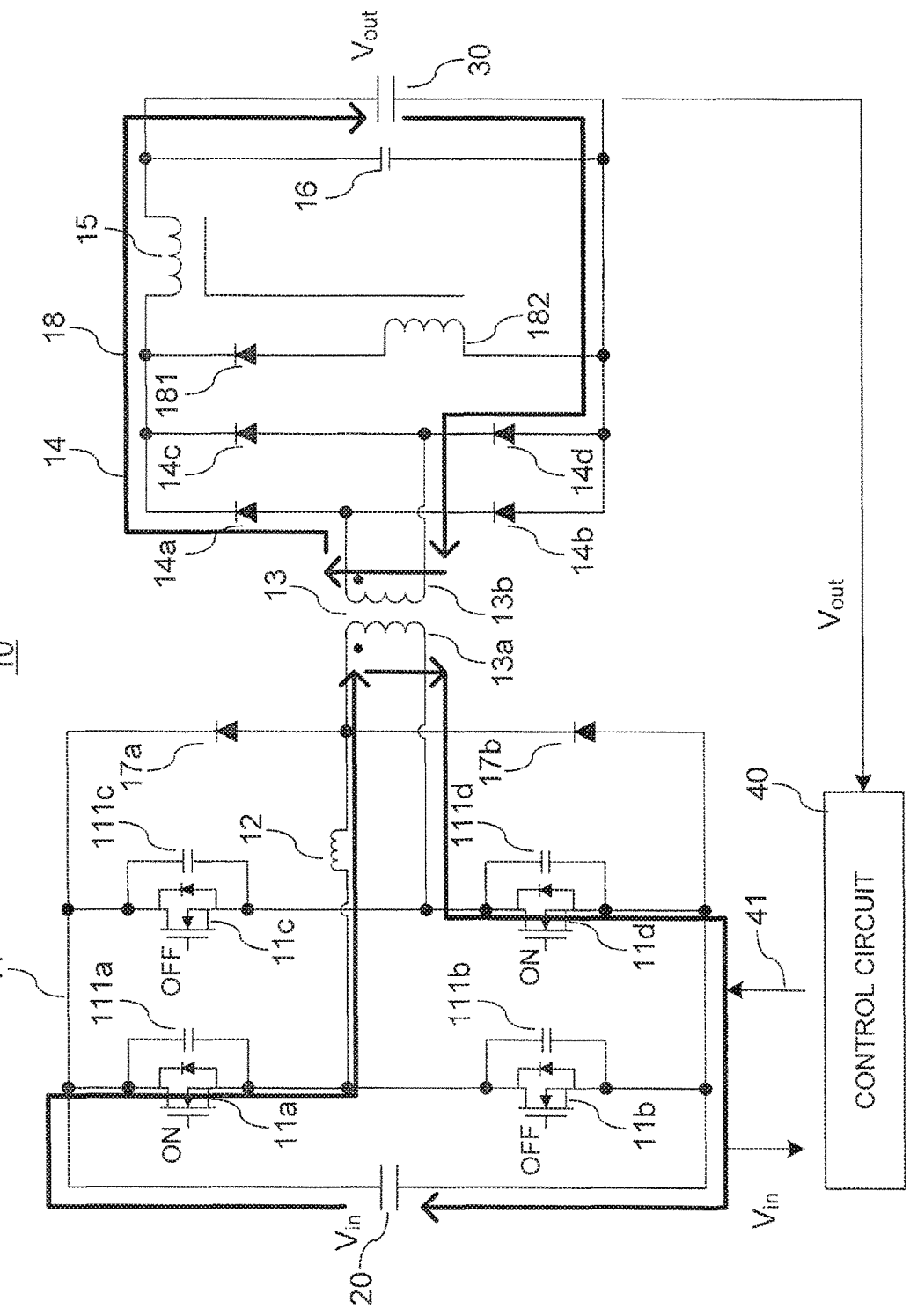
FIG. 3A is a current path diagram illustrating an operation of the DC/DC converter according to the first embodiment of this invention.

In a period prior to a time t0, the respective gate signals 41 of the switching elements 11a, 11d are ON. On the primary side, therefore, as shown in FIG. 3A, a current flows along a path constituted by the DC power supply 20, the switching element 11a, the resonance reactor 12, the transformer primary side 13a, the switching element 11d, and the DC power supply 20. Further, on the secondary side, a current flows along a path constituted by the transformer secondary side 13b, the diode 14a, the smoothing reactor 15, the load 30, the diode 14b, and the transformer secondary side 13b. As a result, the current from the DC power supply 20 is supplied to the load 30.

Figure 3B:
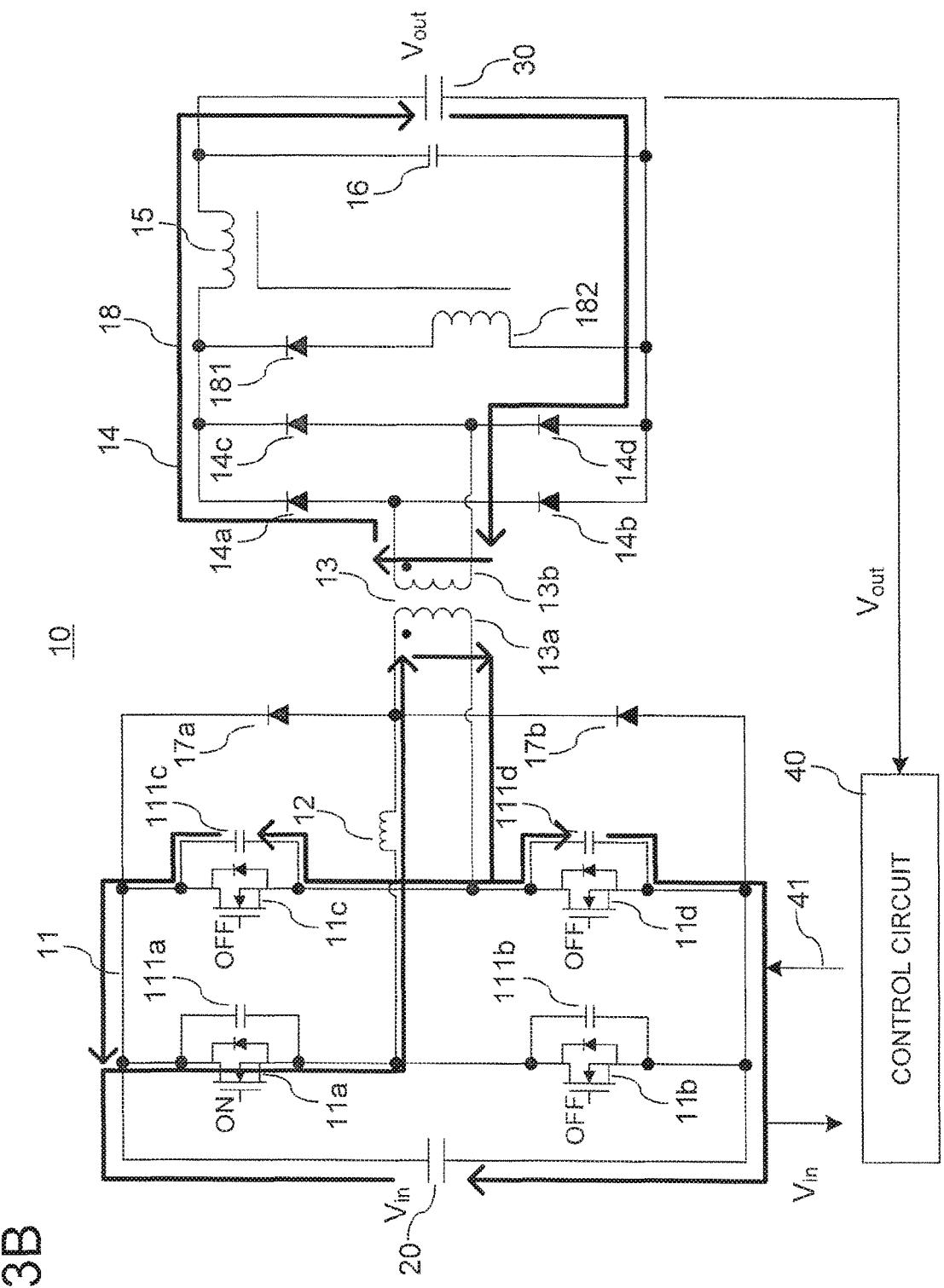
FIG. 3B is a current path diagram illustrating an operation of the DC/DC converter according to the first embodiment of this invention.

At the time t0, the gate signal 41 of the switching elements 11d is switched OFF. In this case, as shown in FIG. 3B, the current previously flowing through the switching element 11d flows in a direction for charging the resonance capacitor 111d during a period extending from the time t0 to a time t1. Accordingly, the drain-source voltage Vds of the switching element 11d gradually increases. At the same time, a current for discharging the resonance capacitor 111c flows along a path constituted by the resonance reactor 12, the transformer primary side 13a, the resonance capacitor 111c, the switching element 11a, and the resonance reactor 12. Accordingly, the drain-source voltage Vds of the switching element 11c gradually decreases.

Figure 3C:
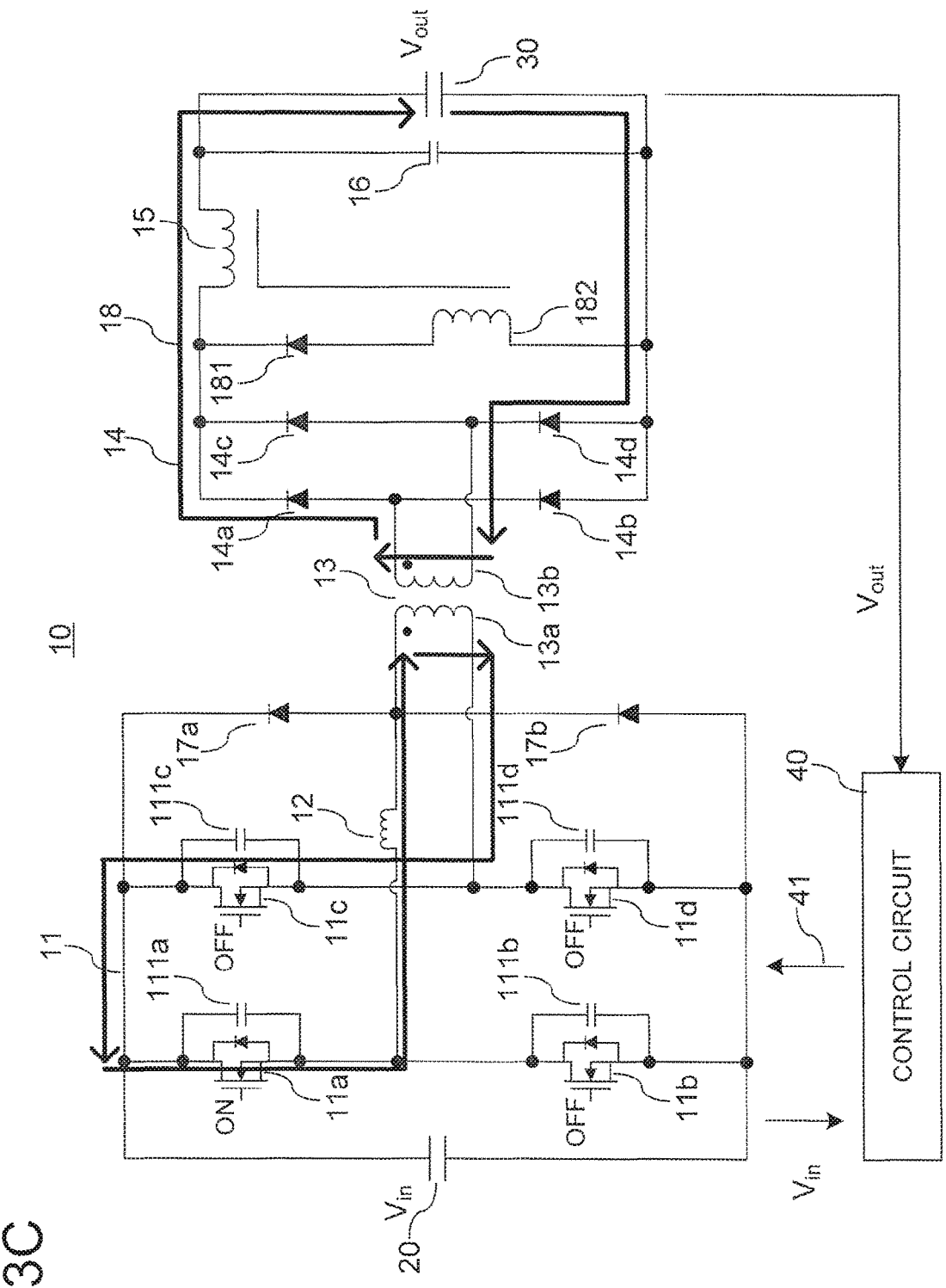
FIG. 3C is a current path diagram illustrating an operation of the DC/DC converter according to the first embodiment of this invention.

Here, a case in which the respective drain-source voltages Vds of the switching elements 11c, 11d reach half (=Vin/2) the voltage of the DC power supply 20 will be considered. Even in this case, currents continue to flow along the current paths shown in FIG. 3B due to the energy of the resonance reactor 12, and at the time t1, the drain-source voltages Vds of the switching elements 11c, 11d reach zero and Vin, respectively. As shown in FIG. 3C, on the primary side at this time, a current flows along a path constituted by the resonance reactor 12, the transformer primary side 13a, the body diode of the switching element 11c, the switching element 11a, and the resonance reactor 12.

In a condition where a current flows through the body diode of the switching element 11c along the current path shown in FIG. 3C from the time t1 onward, the gate signal 41 of the switching element 11c is switched ON at a time t2, whereby ZVS is established.

Further, from t1 onward, the voltage applied to the transformer primary side 13a substantially disappears, and therefore the secondary side reflux diode 181 switches ON. A voltage Vc corresponding to a winding ratio of the magnetically coupled smoothing reactor 15 and reflux reactor 182 is applied to the output side of the rectifier circuit 14. Note that the voltage Vc is calculated in accordance with Equation (1), shown below.

Math. 1

$$V_c = \frac{N_2}{N_1 + N_2} \cdot (V_{out} - V_{f10}) - V_{f10} \qquad (1)$$

Here, in Equation (1), N1 denotes a winding number of the smoothing reactor 15, N2 denotes a winding number of the reflux reactor 182, Vout denotes the output DC voltage, and Vf10 denotes a forward direction voltage of the secondary side reflux diode 181.

Further, when the winding number N1 and the winding number N2 are set such that Vc>0, a reverse voltage is applied to the rectifier circuit 14 such that the diodes 14a to 14d are switched OFF. Accordingly, a current no longer flows through the rectifier circuit 14 and the transformer secondary side 13b. In other words, the winding number N1 of the smoothing reactor 15 and the winding number N2 of the reflux reactor 182 are set such that a positive voltage is applied to the output side of the rectifier circuit 14 and a current no longer flows through the rectifier circuit 14 and the transformer secondary side 13b.

Figure 3D:
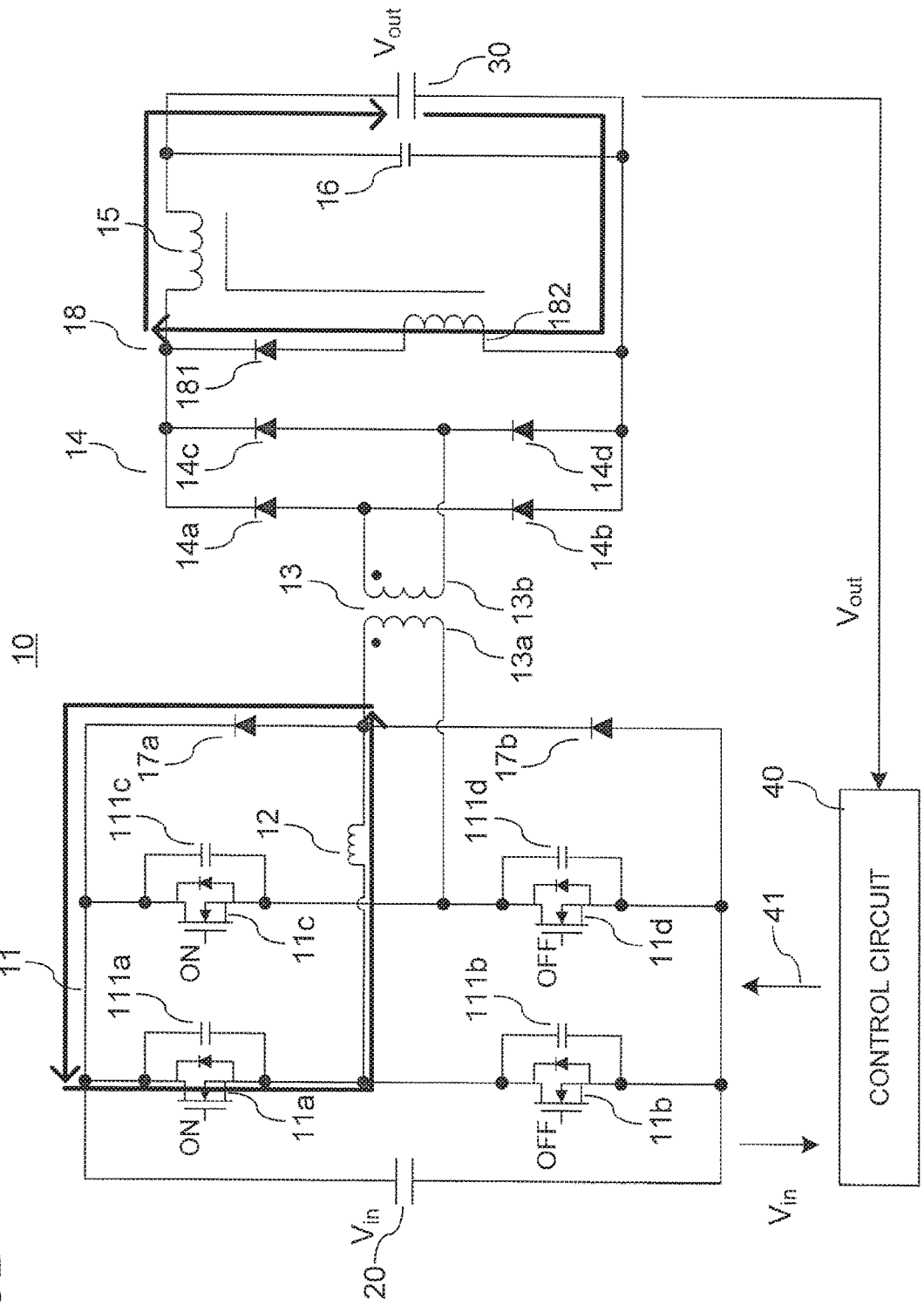
FIG. 3D is a current path diagram illustrating an operation of the DC/DC converter according to the first embodiment of this invention.

As a result, as shown in FIG. 3D, on the secondary side, a current flows along a path constituted by the smoothing reactor 15, the load 30, the reflux reactor 182, the secondary side reflux diode 181, and the smoothing reactor 15. Further, on the primary side, a current no longer flows through the transformer primary side 13a. However, the primary side reflux diode 17a is provided, and therefore a current continues to flow along a path constituted by the resonance reactor 12, the primary side reflux diode 17a, the switching element 11a, and the resonance reactor 12.

Note that during a period extending from the time t2 to a time t3, a recovery current is generated when a current stops flowing through the diodes 14a, 14d such that the diodes 14a, 14d are switched OFF. In this case, however, only the voltage Vc is applied to the output side of the rectifier circuit 14. Therefore, by setting the voltage Vc to be sufficiently smaller than a withstand voltage of the diodes 14a to 14d of the rectifier circuit 14, a surge caused by the effect of the recovery voltage does not pose a problem.

Hence, during the period in which the voltage of the DC power supply 20 is not applied to the transformer primary side 13a, the secondary side reflux circuit 18 diverts the load current so that the load current is returned to the load 30, and therefore the load current flowing through the rectifier circuit 14 is suppressed. In other words, the load current flows using the series circuit formed by connecting the reflux reactor 182 and the secondary side reflux diode 181 in series, rather than the rectifier circuit 14, as a reflux path. Accordingly, a surge is generated due to the effect of a recovery current from the secondary side reflux diode 181 alone, rather than the two diodes (i.e. the diodes 14a and 14d) on the reflux path of the rectifier circuit 14, and as a result, an overall reduction in the surge can be achieved.

Figure 3E:
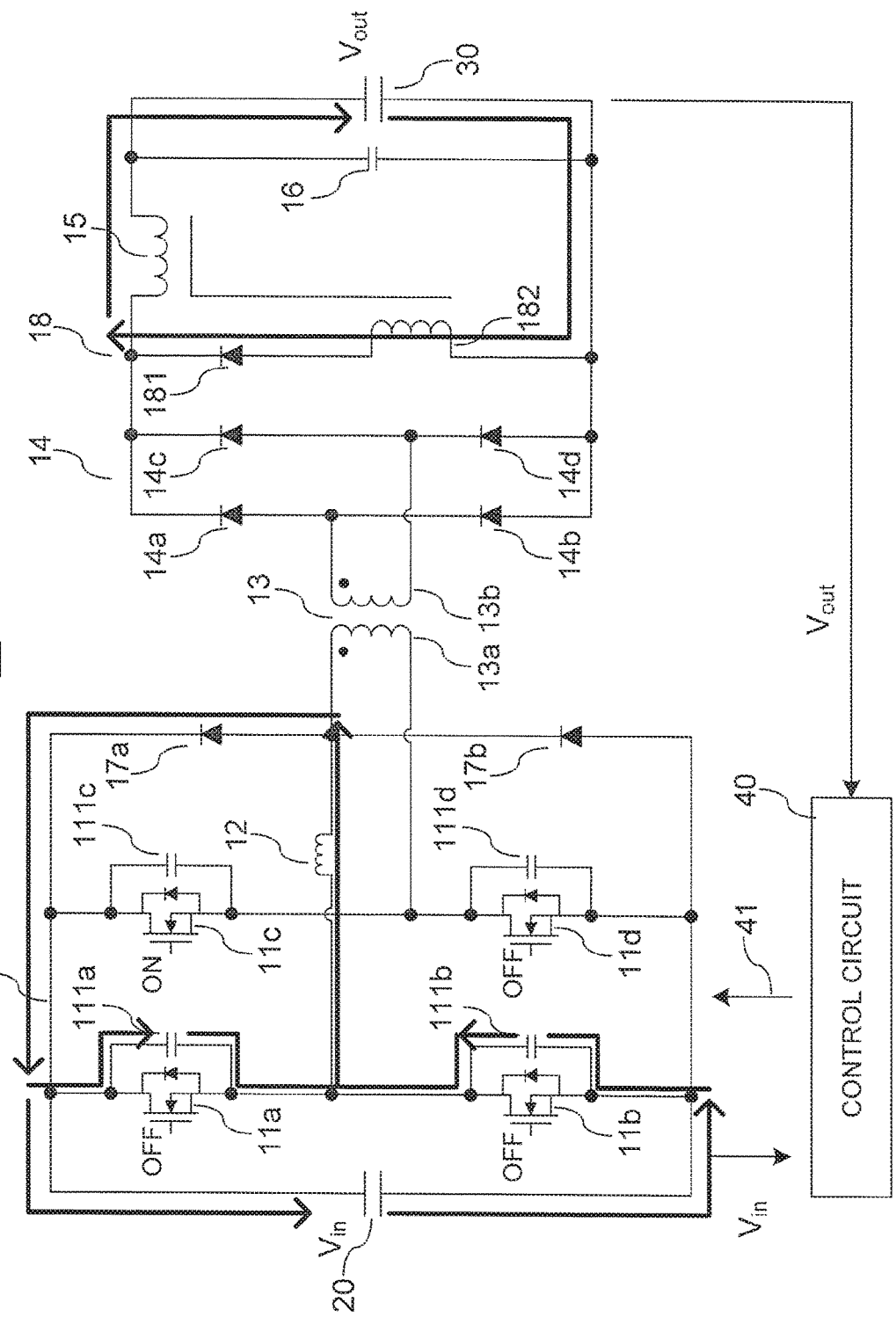
FIG. 3E is a current path diagram illustrating an operation of the DC/DC converter according to the first embodiment of this invention.

At the time t3, the gate signal 41 of the switching element 11a is switched OFF. In this case, as shown in FIG. 3E, the current flowing previously through the switching element 11a flows in a direction for charging the resonance capacitor 111a during a period extending from the time t3 to a time t4. Accordingly, the drain-source voltage Vds of the switching element 11a gradually increases. At the same time, a current for discharging the resonance capacitor 111b flows along a path constituted by the resonance reactor 12, the primary side reflux diode 17a, the DC power supply 20, the resonance capacitor 111b, and the resonance reactor 12. Accordingly, the drain-source voltage Vds of the switching element 11b gradually decreases.

Figure 3F:
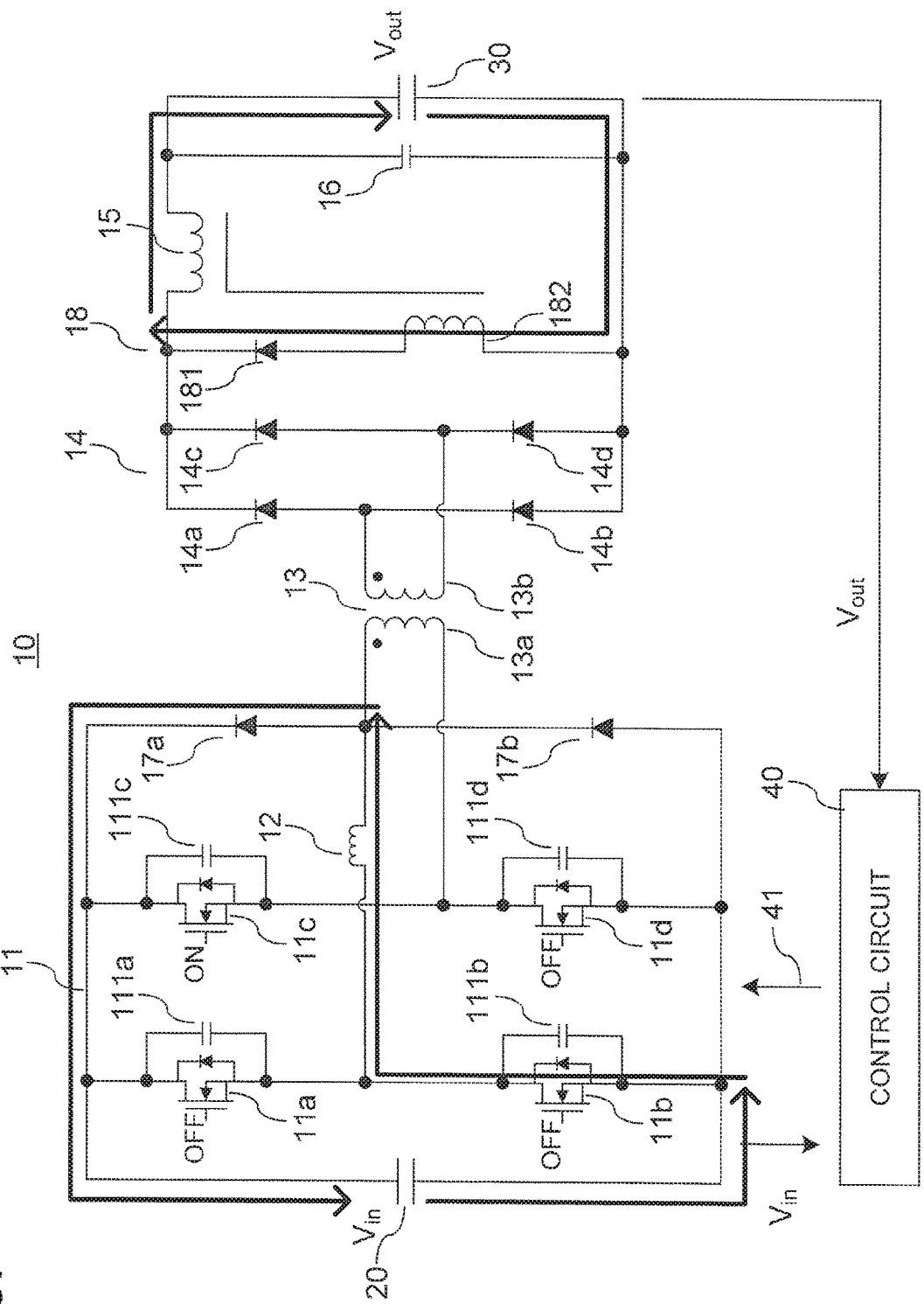
FIG. 3F is a current path diagram illustrating an operation of the DC/DC converter according to the first embodiment of this invention.

Here, a case in which the respective drain-source voltages Vds of the switching elements 11a, 11b reach half (=Vin/2) the voltage of the DC power supply 20 will be considered. Even in this case, currents continue to flow along the current paths shown in FIG. 3E due to the energy of the resonance reactor 12, and at the time t4, the drain-source voltages of the switching elements 11a, 11b reach Vin and zero, respectively. At this time, as shown in FIG. 3F, on the primary side, a current flows along a path constituted by the resonance reactor 12, the primary side reflux diode 17a, the DC power supply 20, the body diode of the switching element 11b, and the resonance reactor 12 during a period extending from the time t4 to a time t5.

Figure 3G:
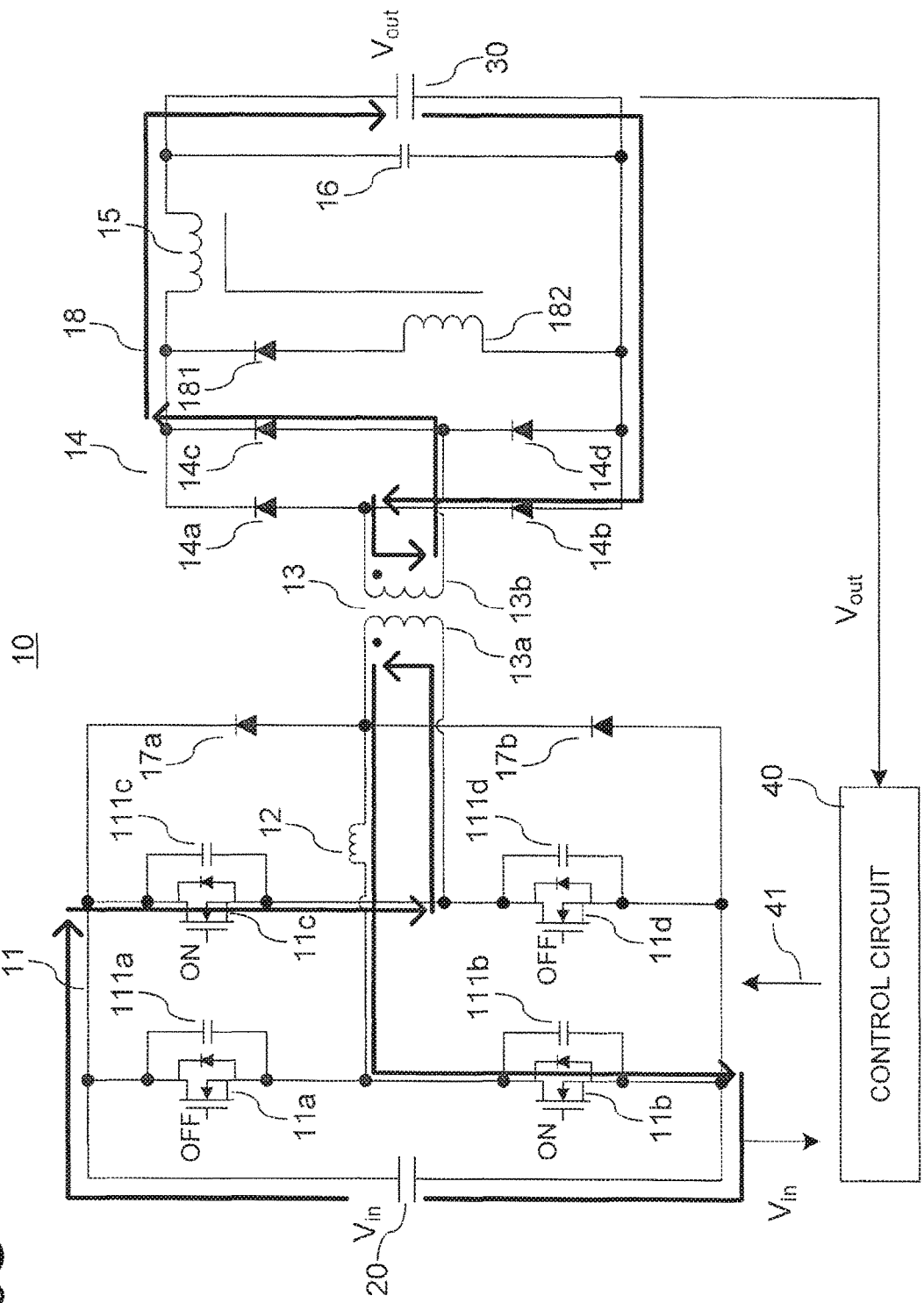
FIG. 3G is a current path diagram illustrating an operation of the DC/DC converter according to the first embodiment of this invention.

At the time t5, the gate signal 41 of the switching element 11b is switched ON. In this case, ZVS is established. Further, on the primary side, as shown in FIG. 3G, a current flows along a path constituted by the DC power supply 20, the switching element 11c, the transformer primary side 13a, the resonance reactor 12, the switching element 11b, and the DC power supply 20 during a period extending from the time t5 to a time t6. On the secondary side, meanwhile, a current flows along a path constituted by the transformer secondary side 13b, the diode 14c, the smoothing reactor 15, the load 30, the diode 14b, and the transformer secondary side 13b. As a result, the current from the DC power supply 20 is supplied to the load 30.

The period extending from the time t0 to the time t6, described above, is a half period, and during this half period, the switching elements 11a, 11d are switched OFF while the switching elements 11b, 11c are switched ON. The remaining half period is a period extending from the time t6 to a time t12, and during the remaining half period, similar control to that of the period extending from the time t0 to the time t6 is implemented such that the switching elements 11b, 11c are switched OFF and the switching elements 11a, 11d are switched ON. By implementing similar control repeatedly using the period extending from the time t0 to the time t12 as a single period, the load current is caused to flow continuously through the load 30.

According to the first embodiment, as described above, a configuration including a secondary side reflux circuit connected to the output side of the rectifier circuit in order to divert the load current flowing through the load during the period in which the voltage from the DC power supply is not applied to the primary side of the transformer, a first primary side reflux semiconductor switching element connected at one end to the connection point between the resonance reactor and the primary side of the transformer and at another end to one end of the DC power supply, and a second primary side reflux semiconductor switching element connected at one end to the other end of the DC power supply and at another end to the connection point between the resonance reactor and the primary side of the transformer is provided. Further, either the first primary side reflux semiconductor switching element or the second primary side reflux semiconductor switching element diverts the current flowing through the resonance reactor during the period in which the voltage from the DC power supply is not applied to the primary side of the transformer. Furthermore, a series circuit formed by connecting the smoothing reactor and the load in series is connected to the output side of the rectifier circuit, and the secondary side reflux circuit is positioned between the output side of the rectifier circuit and the series circuit and connected in parallel to the series circuit.

Hence, surge generation due to the effect of the recovery voltage can be suppressed, and ZVS feasibility can be secured while implementing driving using a soft switching method. Further, a snubber circuit is not provided, and therefore surge countermeasures on the secondary side including the snubber circuit and so on are not required. Moreover, loss occurring in primary side semiconductor switching elements can be reduced. As a result, the DC/DC converter can be improved in efficiency and reduced in size.

Note that in the first embodiment, the secondary side reflux diode 181 may be designed to have a characteristic according to which the size of the recovery current generated during switching is smaller than that of the diodes 14a to 14d of the rectifier circuit 14. Further, the secondary side reflux diode 181 may be formed from a wide bandgap semiconductor (a silicon carbide or gallium nitride-based material, diamond, or the like, for example). More specifically, by employing a schottky barrier diode or the like in which the secondary side reflux diode 181 is formed from a wide bandgap semiconductor, the surge caused by the effect of the recovery current can be reduced even further.

Furthermore, in the first embodiment, an example in which the winding number N1 and the winding number N2 are set such that a current does not flow through the rectifier circuit 14 and the transformer secondary side 13b during the period in which the voltage of the DC power supply 20 is not applied to the transformer primary side 13a was described. Instead, however, an allowable range of a current that may flow through the rectifier circuit 14 and the transformer secondary side 13b may be defined, and the winding number N1 and the winding number N2 may be set within the allowable range. By dividing the reflux current flowing through the secondary side between the diodes 14a to 14d of the rectifier circuit 14 and the secondary side reflux diode 181, a forward current caused by recovery generation can be reduced.

Moreover, in the first embodiment, various modified examples may be employed with respect to the specific circuit configuration on the secondary side of the DC/DC converter 10. These modified examples will now be described with reference to FIGS. 4 to 10. FIGS. 4 to 10 are views showing configurations of modified examples of the secondary side of the DC/DC converter 10 according to the first embodiment of this invention.

Figure 4:
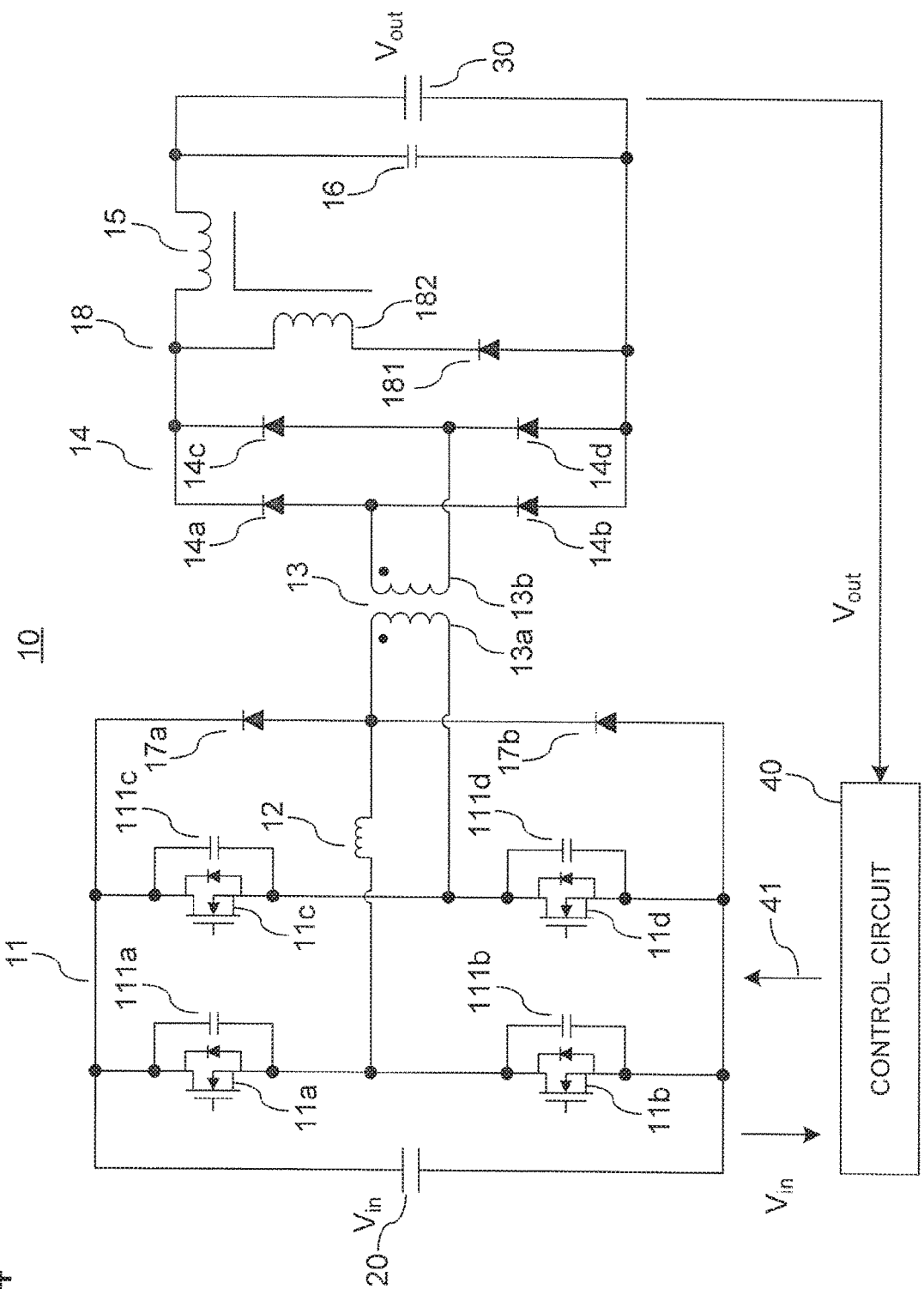
FIG. 4 is a view showing a configuration of a modified example of a secondary side of the DC/DC converter according to the first embodiment of this invention.

In the first embodiment, a case in which the anode of the secondary side reflux diode 181 is connected to one end of the reflux reactor 182, the cathode is connected to the positive side output terminal of the rectifier circuit 14, and the other end of the reflux reactor 182 is connected to the negative side output terminal of the rectifier circuit 14 was described as an example. As shown in FIG. 4, however, a configuration in which the cathode of the secondary side reflux diode 181 is connected to one end of the reflux reactor 182, the anode is connected to the negative side output terminal of the rectifier circuit 14, and the other end of the reflux reactor 182 is connected to the positive side output terminal of the rectifier circuit 14 may be employed instead.

By employing this configuration, the respective reactors of the magnetically coupled smoothing reactor 15 and reflux reactor 182 can share the terminal that is connected to the positive side of the output side of the rectifier circuit 14. As a result, the number of terminals serving as the coupled reactor including the smoothing reactor 15 and the reflux reactor 182 can be reduced.

In the first embodiment, a case in which the smoothing reactor 15 is provided between the positive side output terminal of the rectifier circuit 14 and the positive side terminal of the load 30 was described as an example, but the smoothing reactor 15 may be provided between the negative side output terminal of the rectifier circuit 14 and the negative side terminal of the load 30 instead.

Figure 5:
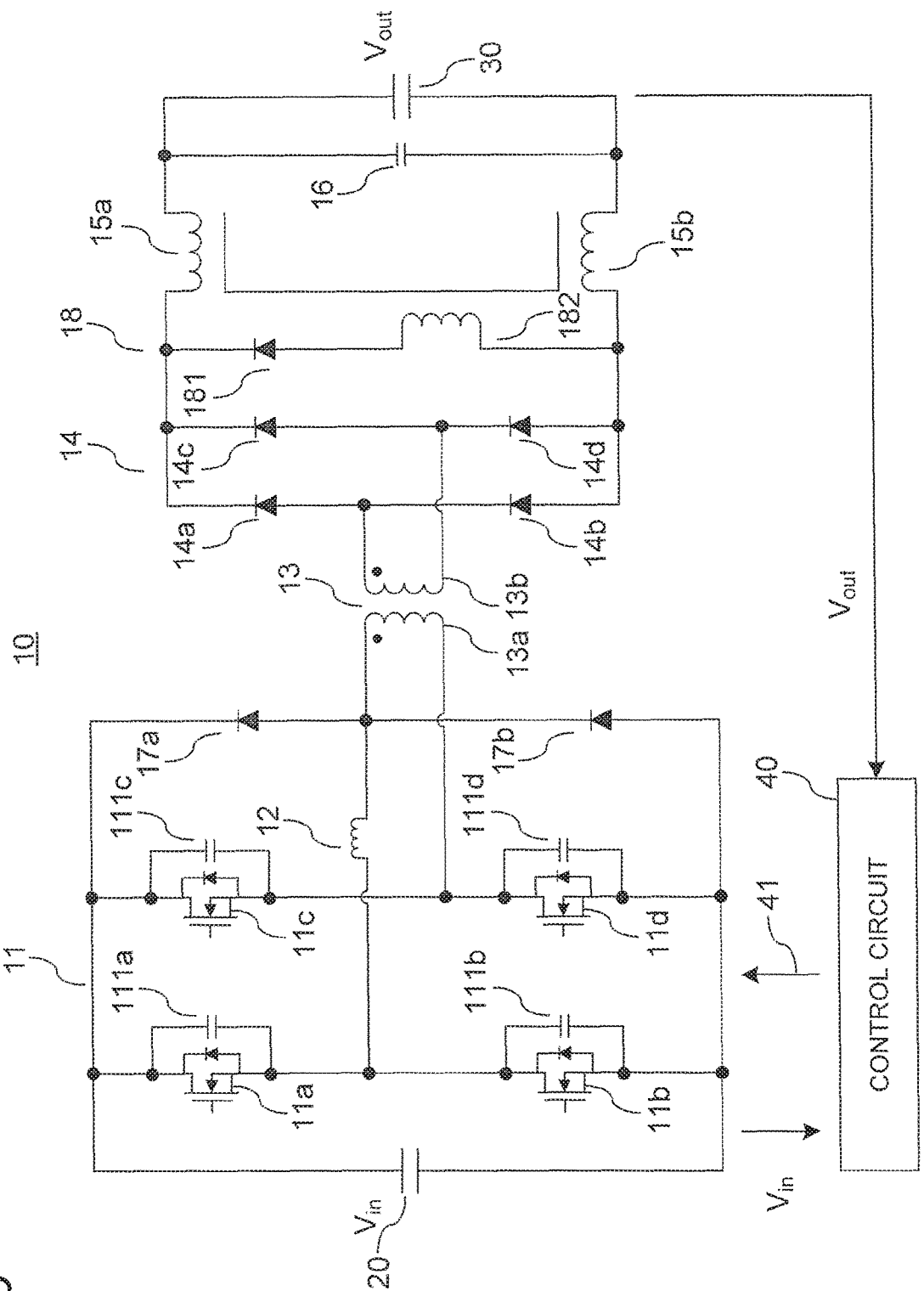
FIG. 5 is a view showing a configuration of a modified example of the secondary side of the DC/DC converter according to the first embodiment of this invention.

Further, the smoothing reactor 15 may be provided both between the positive side output terminal of the rectifier circuit 14 and the positive side terminal of the load 30 and between the negative side output terminal of the rectifier circuit 14 and the negative side terminal of the load 30. In this case, as shown in FIG. 5, one end of a smoothing reactor 15a is connected to the positive side output terminal of the rectifier circuit 14, and another end is connected to the positive side terminal of the load 30. Further, one end of a smoothing reactor 15b is connected to the negative side output terminal of the rectifier circuit 14, and another end is connected to the negative side terminal of the load 30.

Figure 6:
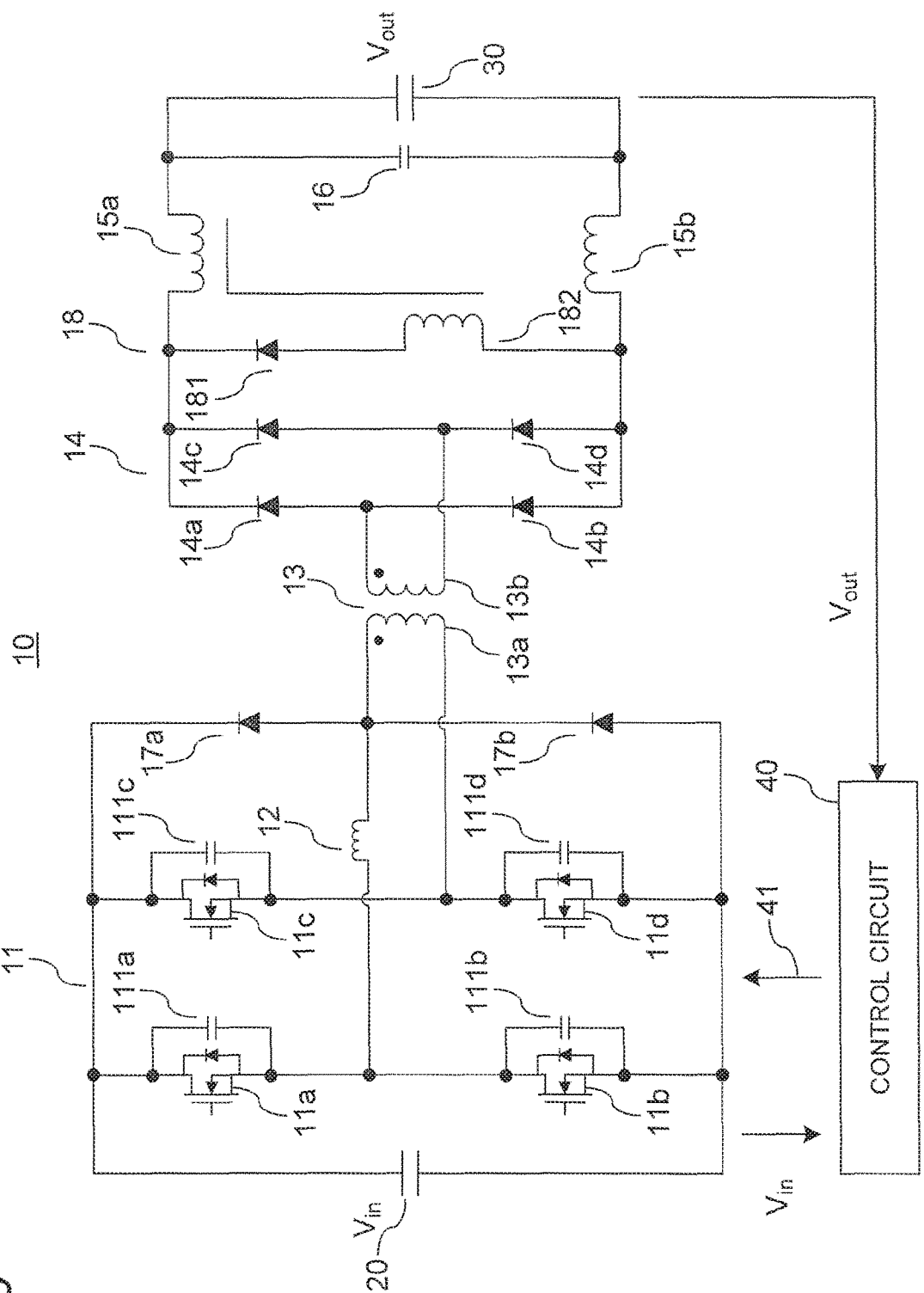
FIG. 6 is a view showing a configuration of a modified example of the secondary side of the DC/DC converter according to the first embodiment of this invention.
Figure 7:
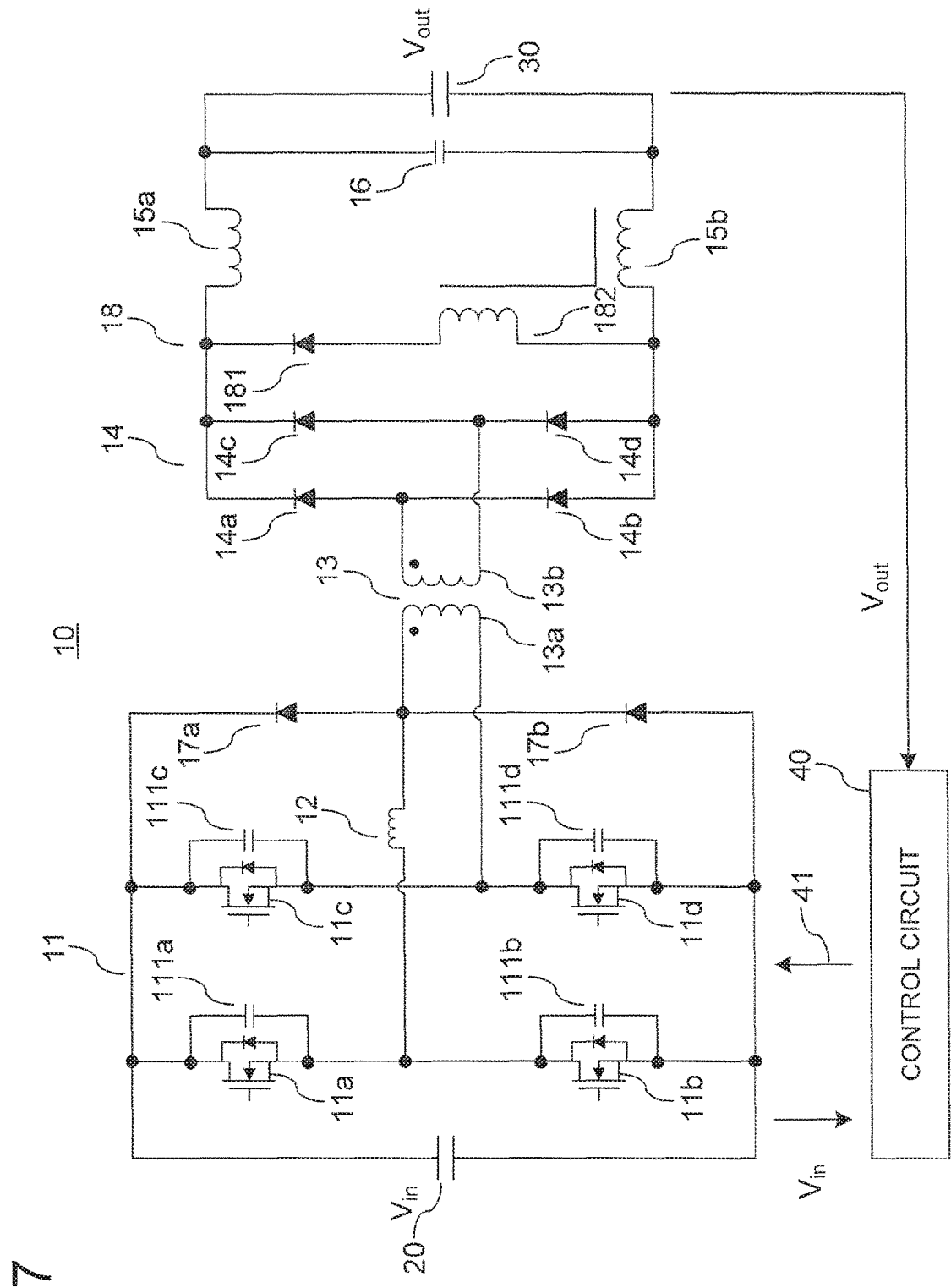
FIG. 7 is a view showing a configuration of a modified example of the secondary side of the DC/DC converter according to the first embodiment of this invention.

In this configuration, as shown in FIG. 5, the smoothing reactor 15a, the smoothing reactor 15b, and the reflux reactor 182 may all be magnetically coupled. Alternatively, as shown in FIG. 6, only the smoothing reactor 15a and the reflux reactor 182 may be magnetically coupled. Alternatively, as shown in FIG. 7, only the smoothing reactor 15b and the reflux reactor 182 may be magnetically coupled.

Figure 8:
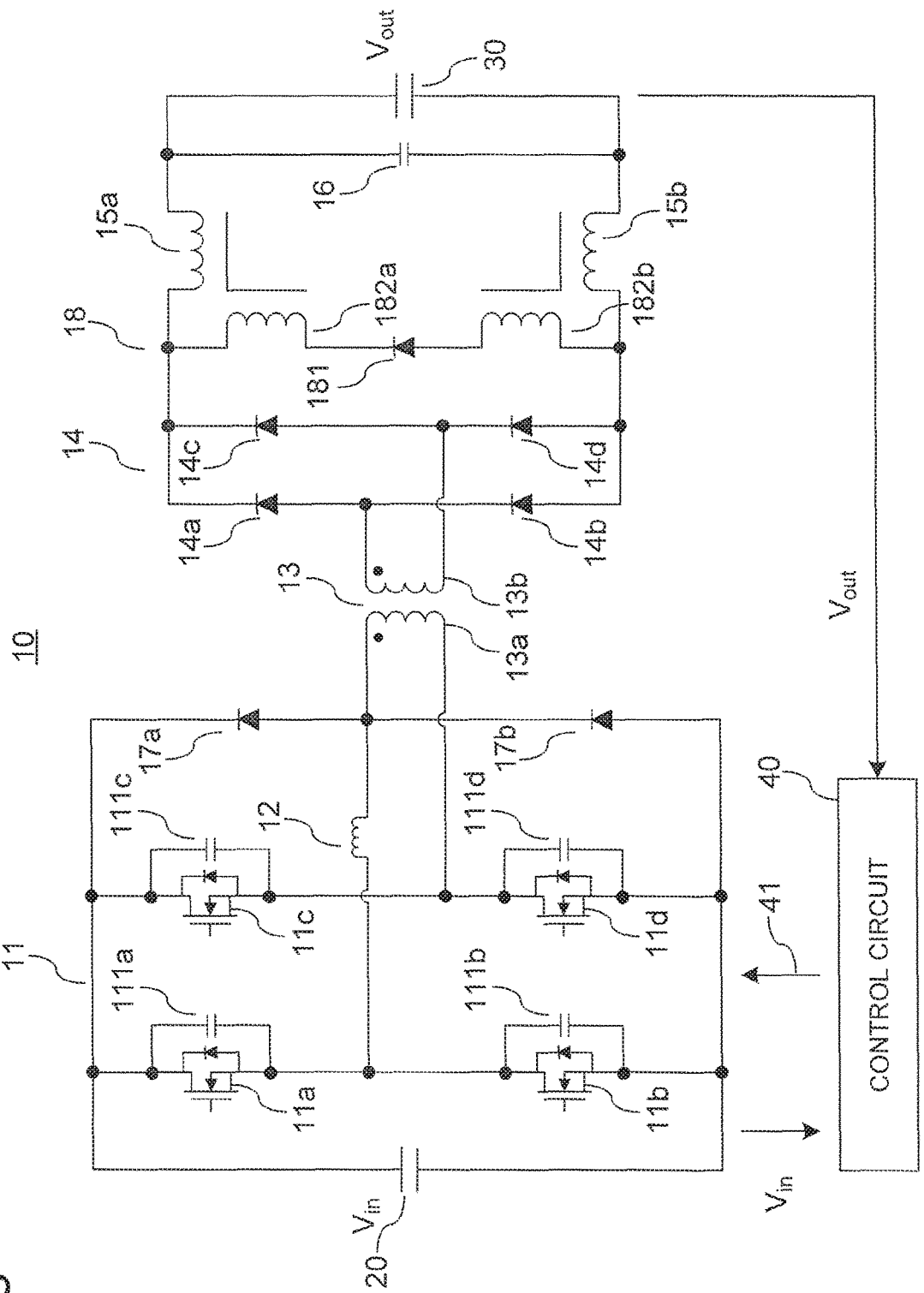
FIG. 8 is a view showing a configuration of a modified example of the secondary side of the DC/DC converter according to the first embodiment of this invention.

Furthermore, a reflux reactor 182a that is magnetically coupled to the smoothing reactor 15a and a reflux reactor 182b that is magnetically coupled to the smoothing reactor 15b may be provided on the secondary side reflux circuit 18 as the reflux reactor 182. In this case, as shown in FIG. 8, one end of the reflux reactor 182a is connected to the positive side output terminal of the rectifier circuit 14, and another end is connected to the cathode of the secondary side reflux diode 181. Further, one end of the reflux reactor 182b is connected to the negative side output terminal of the rectifier circuit 14, and another end is connected to the anode of the secondary side reflux diode 181.

Figure 9:
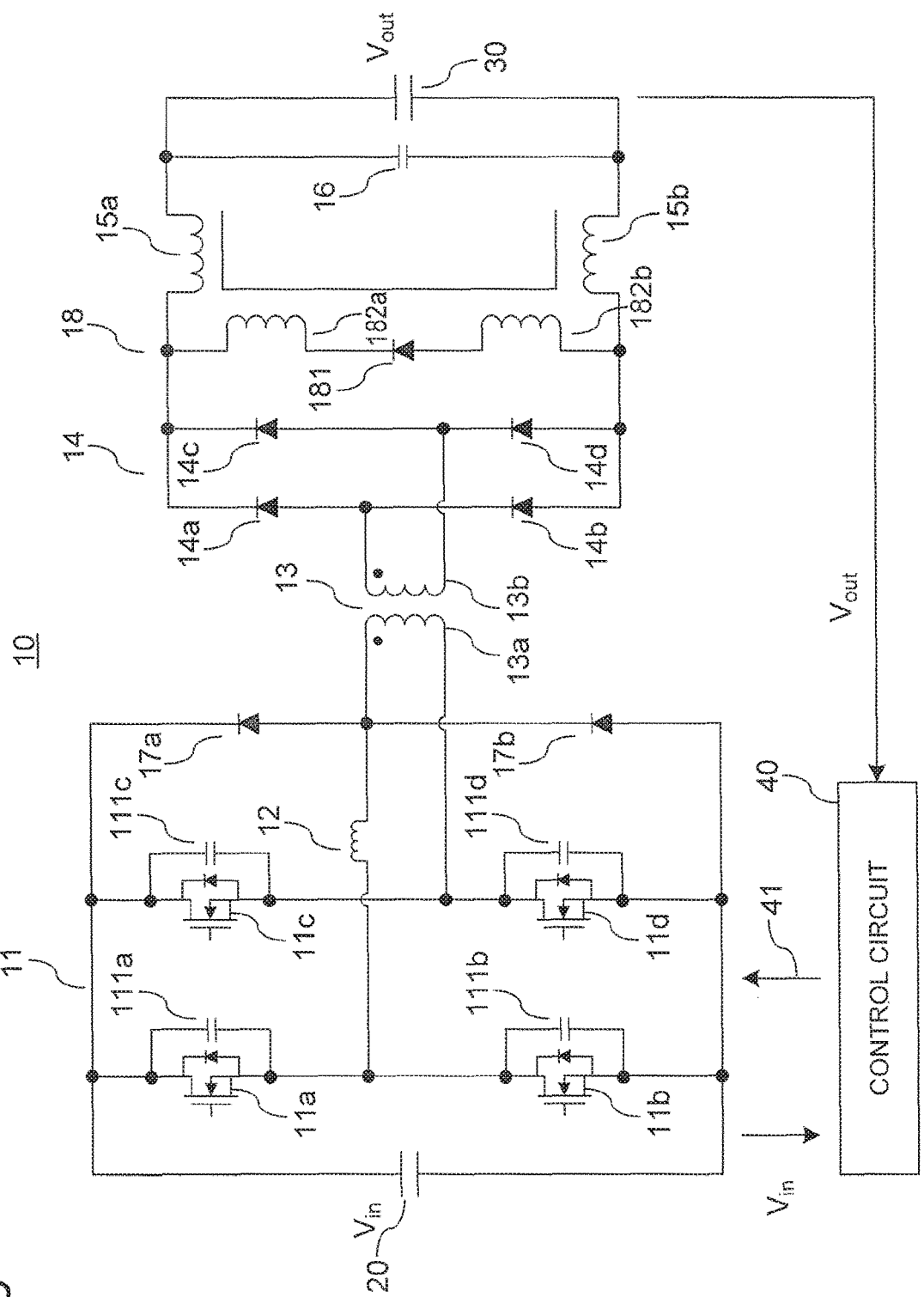
FIG. 9 is a view showing a configuration of a modified example of the secondary side of the DC/DC converter according to the first embodiment of this invention.

Note that FIG. 8 shows a case in which the reflux reactor 182a, the secondary side reflux diode 181, and the reflux reactor 182b are connected in that order from the positive side output terminal of the rectifier circuit 14 on a series circuit constituted by the reflux reactors 182a, 182b and the secondary side reflux diode 181. However, the order in which these components are connected may be set as desired. Furthermore, as shown in FIG. 9, the smoothing reactor 15a, the smoothing reactor 15b, the reflux reactor 182a, and the reflux reactor 182b may all be magnetically connected.

Figure 10:
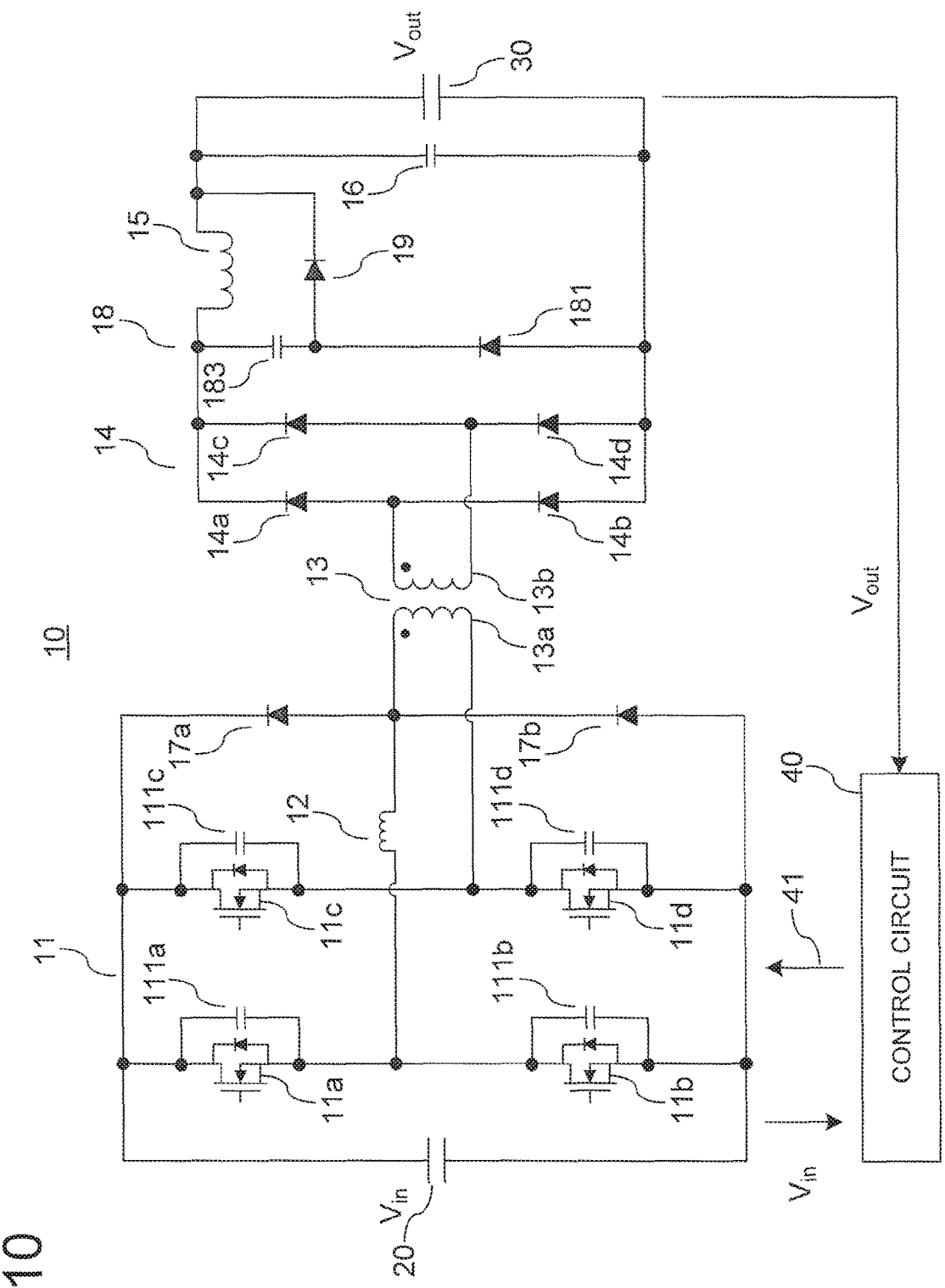
FIG. 10 is a view showing a configuration of a modified example of the secondary side of the DC/DC converter according to the first embodiment of this invention.

In the first embodiment, a case in which the secondary side reflux circuit 18 is configured to include a series circuit formed by connecting the secondary side reflux diode 181 and the reflux reactor 182 in series was described as an example. As shown in FIG. 10, however, the secondary side reflux circuit 18 may be configured to include a series circuit formed by connecting a reflux capacitor 183 and the secondary side reflux diode 181 in series.

More specifically, one end of the reflux capacitor 183 is connected to the cathode of the secondary side reflux diode 181, and another end is connected to the positive side output terminal of the rectifier circuit 14. Further, the anode of the secondary side reflux diode 181 is connected to the negative side output terminal of the rectifier circuit 14. Furthermore, an anode of the bypass diode 19 is connected to a connection point between the cathode of the secondary side reflux diode 181 and the reflux capacitor 183, and a cathode is connected to a connection point between the smoothing reactor 15 and the load 30.

Figure 11A:
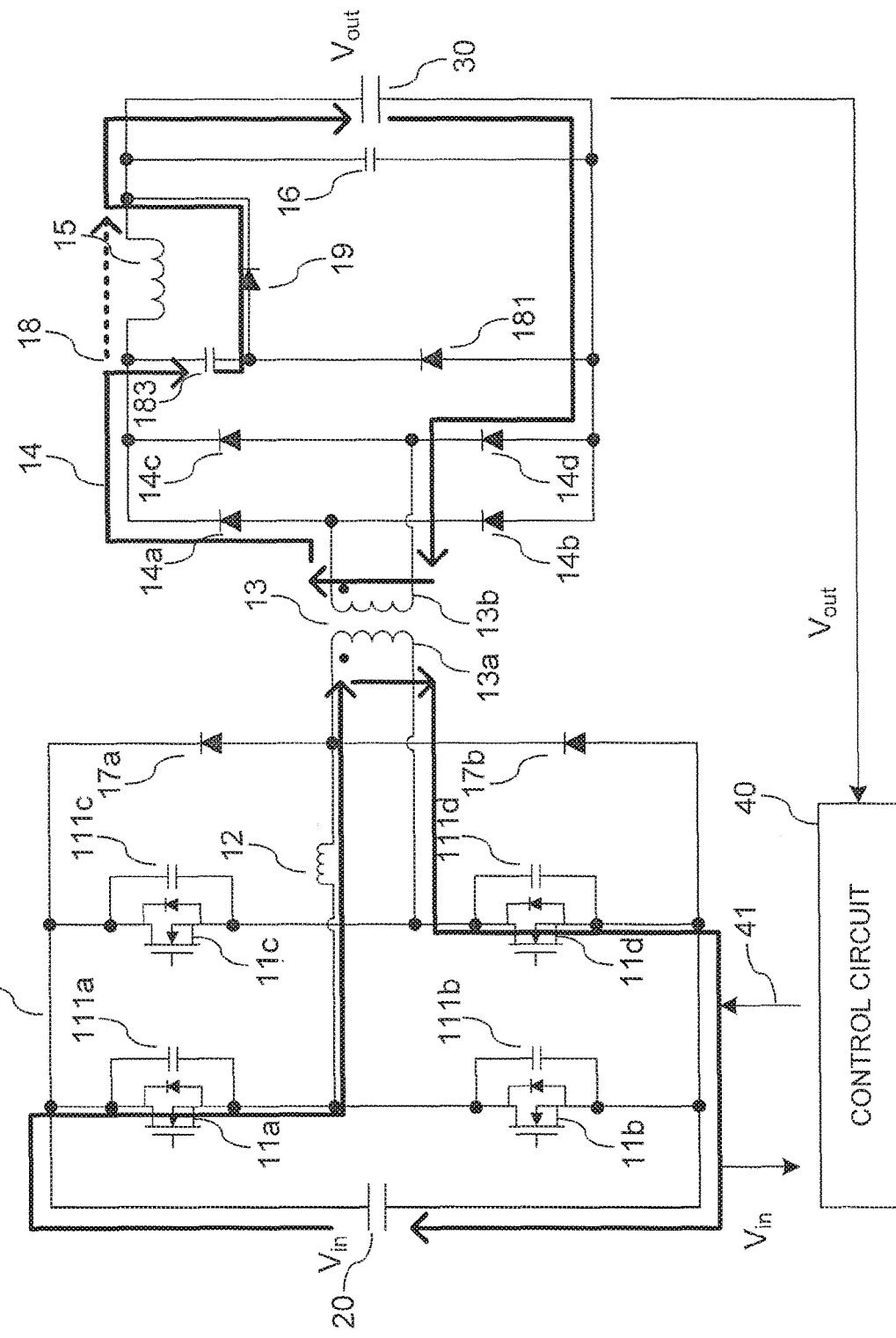
FIG. 11A is a current path diagram illustrating an operation of the DC/DC converter of FIG. 10.
Figure 11B:
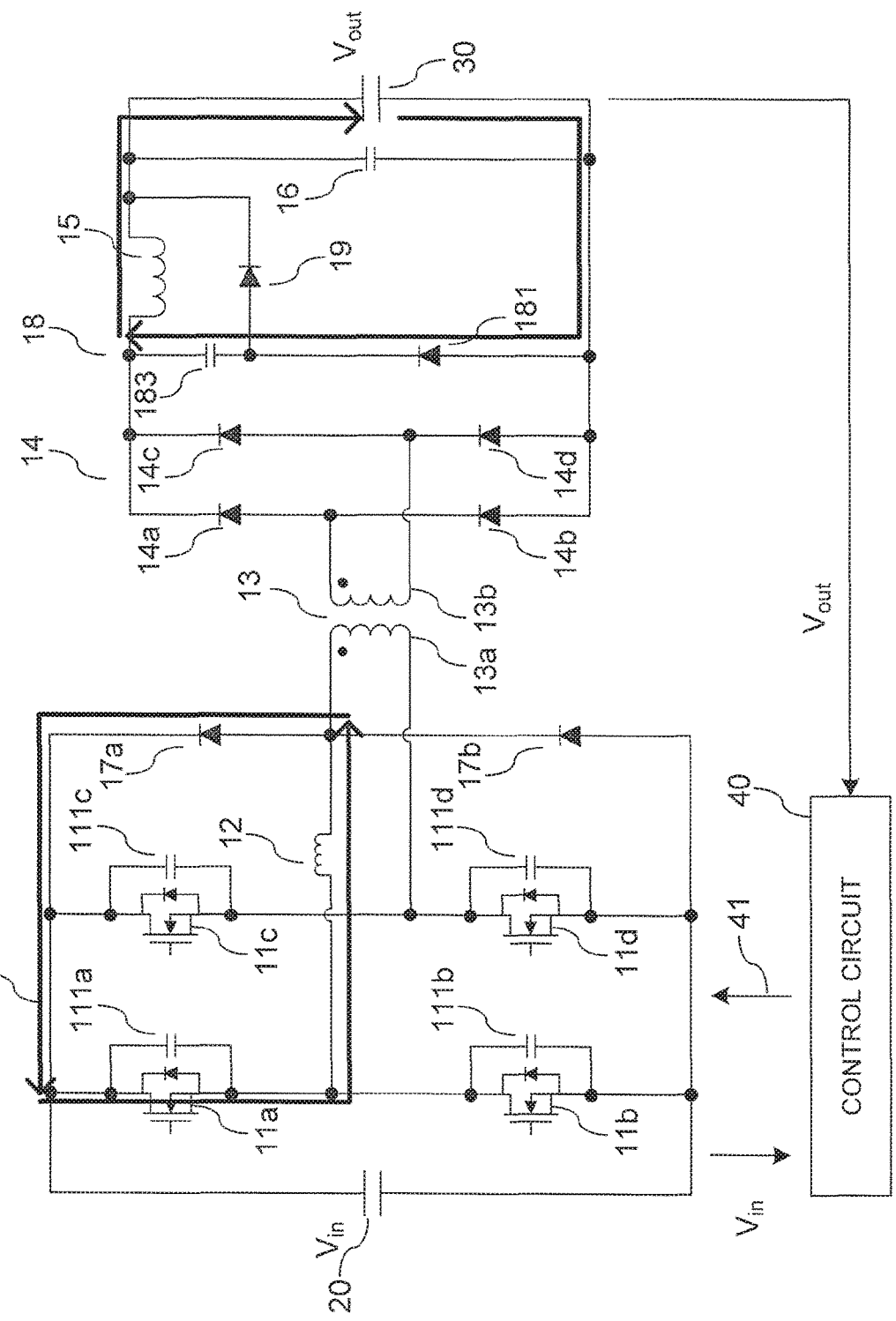
FIG. 11B is a current path diagram illustrating an operation of the DC/DC converter of FIG. 10.

Here, the currents flowing through the circuits at respective timings when switch control is implemented on the switching elements 11a to 11d in accordance with the gate signals 41, as shown in FIG. 2, in a case where the DC/DC converter 10 is configured as shown in FIG. 10 will be described with reference to FIGS. 11A and 11B. FIGS. 11A and 11B are current path diagrams illustrating an operation of the DC/DC converter 10 of FIG. 10.

FIG. 11A shows the current path during the period (corresponding to the period up to the time t0 in FIG. 2) in which the input DC voltage Vin of the DC power supply 20 is applied to the transformer primary side 13a. More specifically, FIG. 11A shows the current path when the switching elements 11a, 11d are switched ON.

As shown in FIG. 11A, on the primary side, a current flows along a path constituted by the DC power supply 20, the switching element 11a, the resonance reactor 12, the transformer primary side 13a, the switching element 11d, and the DC power supply 20.

Further, on the secondary side, a current flows along a path constituted by the transformer secondary side 13b, the diode 14a, the reflux capacitor 183, the diode 19, the load 30, the diode 14d, and the transformer secondary side 13b. As a result, the current from the DC power supply 20 is supplied to the load 30. The current also flows through the smoothing reactor 15, which has a parallel connection relationship with both the reflux capacitor 183 and the diode 19.

FIG. 11B shows the current path during the period (corresponding to the period extending from the time t2 to the time t3 in FIG. 2) in which the input DC voltage Vin from the DC power supply 20 is not applied to the transformer primary side 13a.

As shown in FIG. 11B, on the secondary side, the reflux capacitor 183 is charged, and therefore a current flows along a path constituted by the reflux capacitor 183, the smoothing reactor 15, the load 30, the secondary side reflux diode 181, and the reflux capacitor 183, whereby a positive voltage is applied to the output side of the rectifier circuit 14. Hence, no current flows through the rectifier circuit 14 and the transformer secondary side 13b, and no current flows through the transformer primary side 13a.

Further, on the primary side, although a current no longer flows through the transformer primary side 13a, the primary side reflux diode 17a is provided, and therefore a current continues to flow along a path constituted by the resonance reactor 12, the primary side reflux diode 17a, the switching element 11a, and the resonance reactor 12.

As described above, likewise with a configuration in which the reflux capacitor 183 and the secondary side reflux diode 181 are connected in series as the secondary side reflux circuit 18, the reflux current flowing through the rectifier circuit 14 can be reduced, leading to a reduction in recovery, and as a result, surge generation can be suppressed. Moreover, at the same time, the reflux current flowing through the primary side can be maintained, and as a result, ZVS feasibility can be secured.

Note that in the first embodiment, a case in which the DC/DC converter 10 is driven using a phase shift soft switching method was described, but this invention is not limited to phase shift soft switching, and similar effects can be expected with any method in which a reflux current flows through the transformer primary side 13a during the period in which the voltage from the DC power supply 20 is not applied to the transformer primary side 13a.

Second Embodiment

In the first embodiment, a case in which the DC/DC converter 10 is driven using a phase shift soft switching method was described. In the second embodiment of this invention, meanwhile, a case in which the DC/DC converter 10 is driven using a hard switching method will be described. Note that identical points to the first embodiment will not be described in the second embodiment, and instead the description will focus on differences with the first embodiment.

Figure 12:
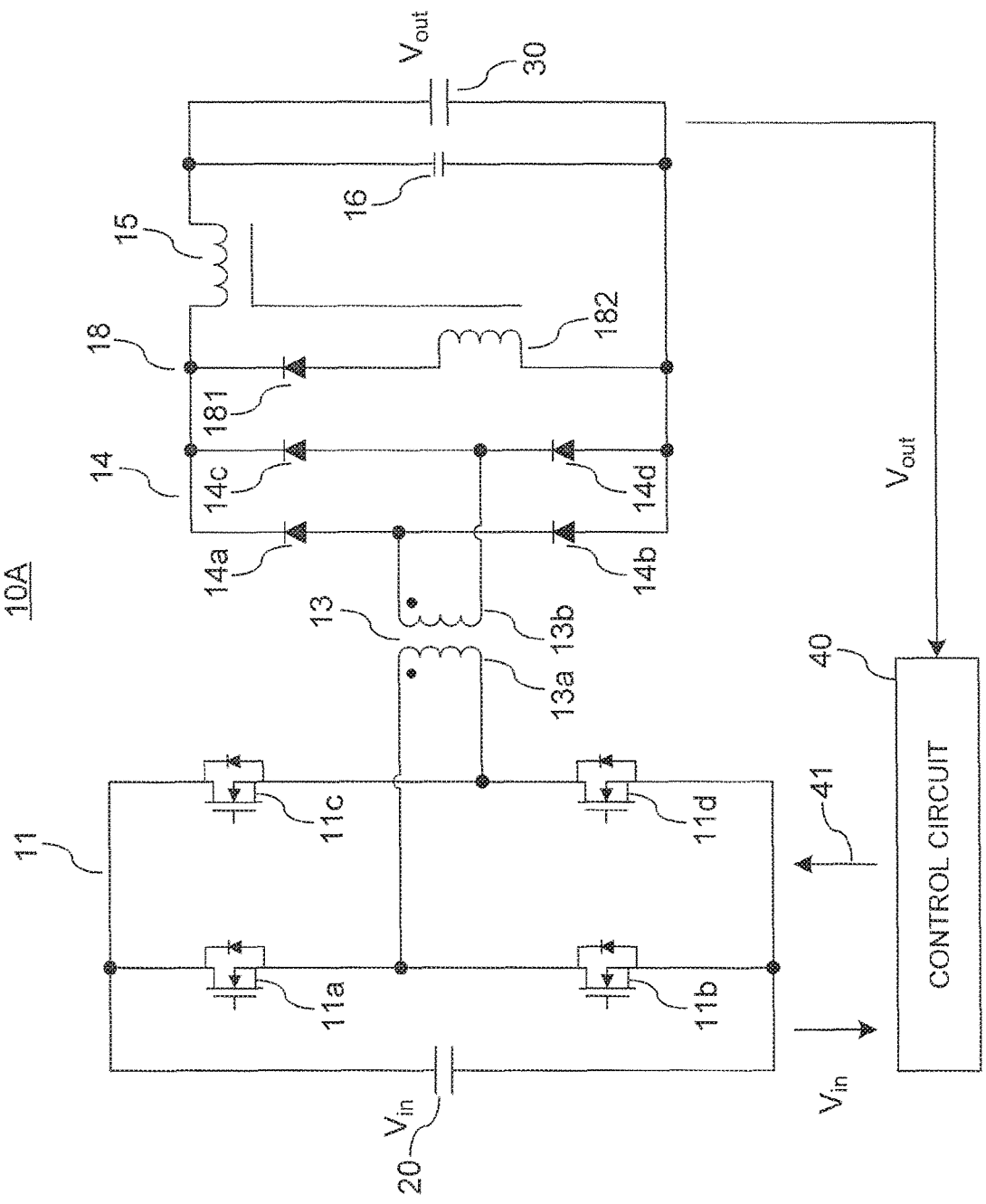
FIG. 12 is a circuit diagram showing a configuration of a DC/DC converter according to a second embodiment of this invention.

FIG. 12 is a circuit diagram showing a configuration of a DC/DC converter 10A according to the second embodiment of this invention. Note that similarly to the first embodiment, FIG. 12 also shows the DC power supply 20, the load 30, and the control circuit 40 for controlling an operation of the DC/DC converter 10A.

In FIG. 12, the DC/DC converter 10A includes the inverter circuit 11, the insulated transformer 13, the rectifier circuit 14, the smoothing reactor 15, the smoothing capacitor 16, and the secondary side reflux circuit 18.

Here, the DC/DC converter 10A differs from the DC/DC converter 10 according to the first embodiment as follows. On the primary side, the resonance capacitors 111a to 111d, the resonance reactor 12, and the primary side reflux diodes 17a and 17b are not provided. Further, the control circuit 40 implements switch control on the switching elements 11a to 11d using a hard switching method rather than a soft switching method. Note that a specific control example of the switch control implemented on the respective switching elements 11a to 11d using a hard switching method will be described below with reference to FIG. 13.

Figure 13:
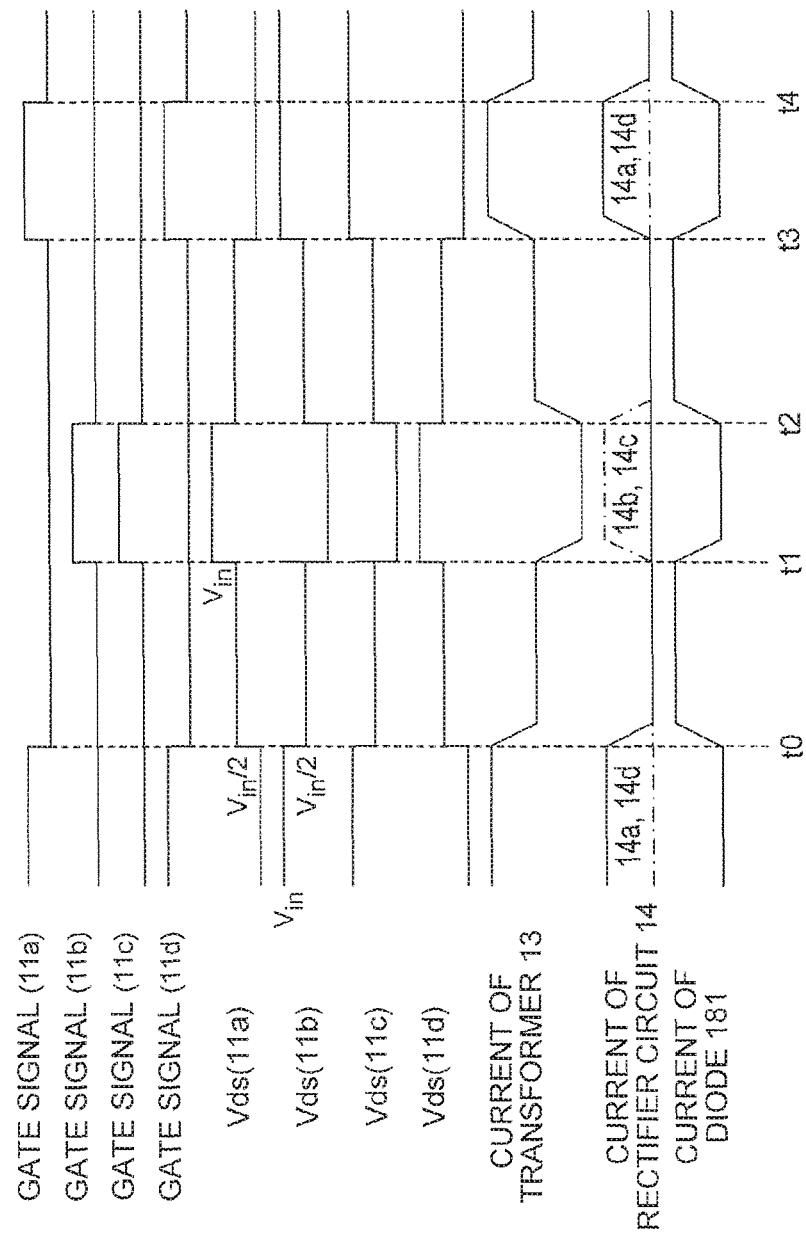
FIG. 13 is a waveform diagram showing variation in parameters of respective parts of the DC/DC converter according to the second embodiment of this invention in order to illustrate an operation of the DC/DC converter.

Next, an operation of the DC/DC converter 10A according to the second embodiment will be described with reference to FIG. 13. FIG. 13 is a waveform diagram showing variation in parameters of respective parts of the DC/DC converter 10A according to the second embodiment of this invention in order to illustrate an operation of the DC/DC converter 10A.

FIG. 13 is a timing chart showing the gate signals 41 output by the control circuit 40 to the respective switching elements 11a to 11d of the inverter circuit 11. FIG. 13 shows variation in the parameters of respective parts of the DC/DC converter 10A as waveforms in a case where switch control is implemented on the switching elements 11a to 11d using a hard switching method in accordance with the gate signals 41.

More specifically, FIG. 13 shows variation in the respective drain-source voltages (Vds) of the switching elements 11a to 11d, and the currents flowing respectively through the transformer 13, the diodes 14a to 14d of the rectifier circuit 14, and the secondary side reflux diode 181.

Note that in FIG. 13, the currents flowing through the diodes 14b, 14c are indicated by dot-dash lines. Further, in the inverter circuit 11, the switching elements 11a, 11d are switched ON together at the same time. Likewise, the switching elements 11b, 11c are switched ON together at the same time. Furthermore, a period in which all of the switching elements 11a to 11d are switched OFF is provided, while the combination of the switching elements 11a, 11d and the combination of the switching elements 11b, 11c are switched ON alternately. Note that output control is executed by setting the respective duties of the switching elements 11a, 11d and the switching elements 11b, 11c to be variable.

Figure 14A:
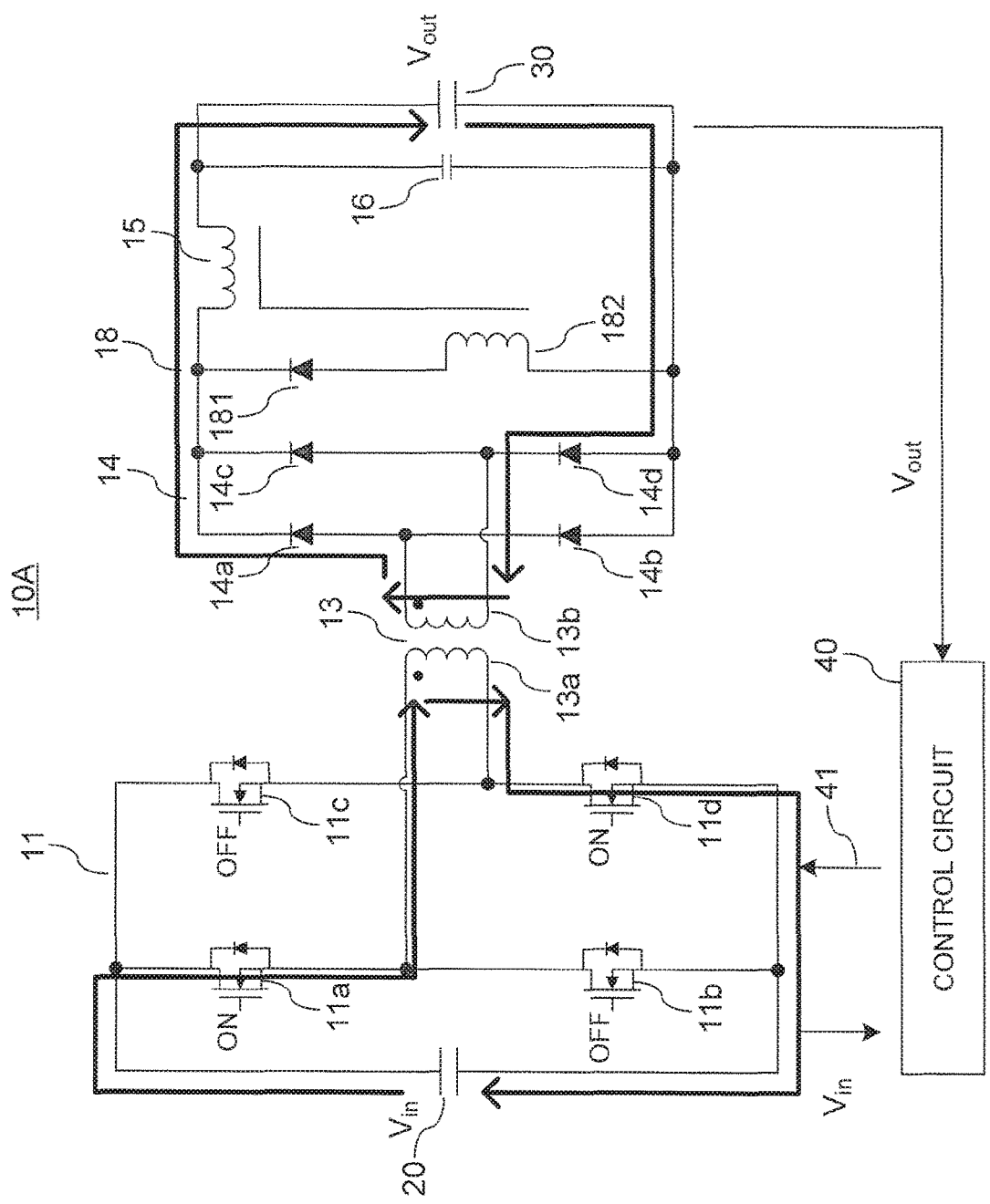
FIG. 14A is a current path diagram illustrating an operation of the DC/DC converter according to the second embodiment of this invention.
Figure 14B:
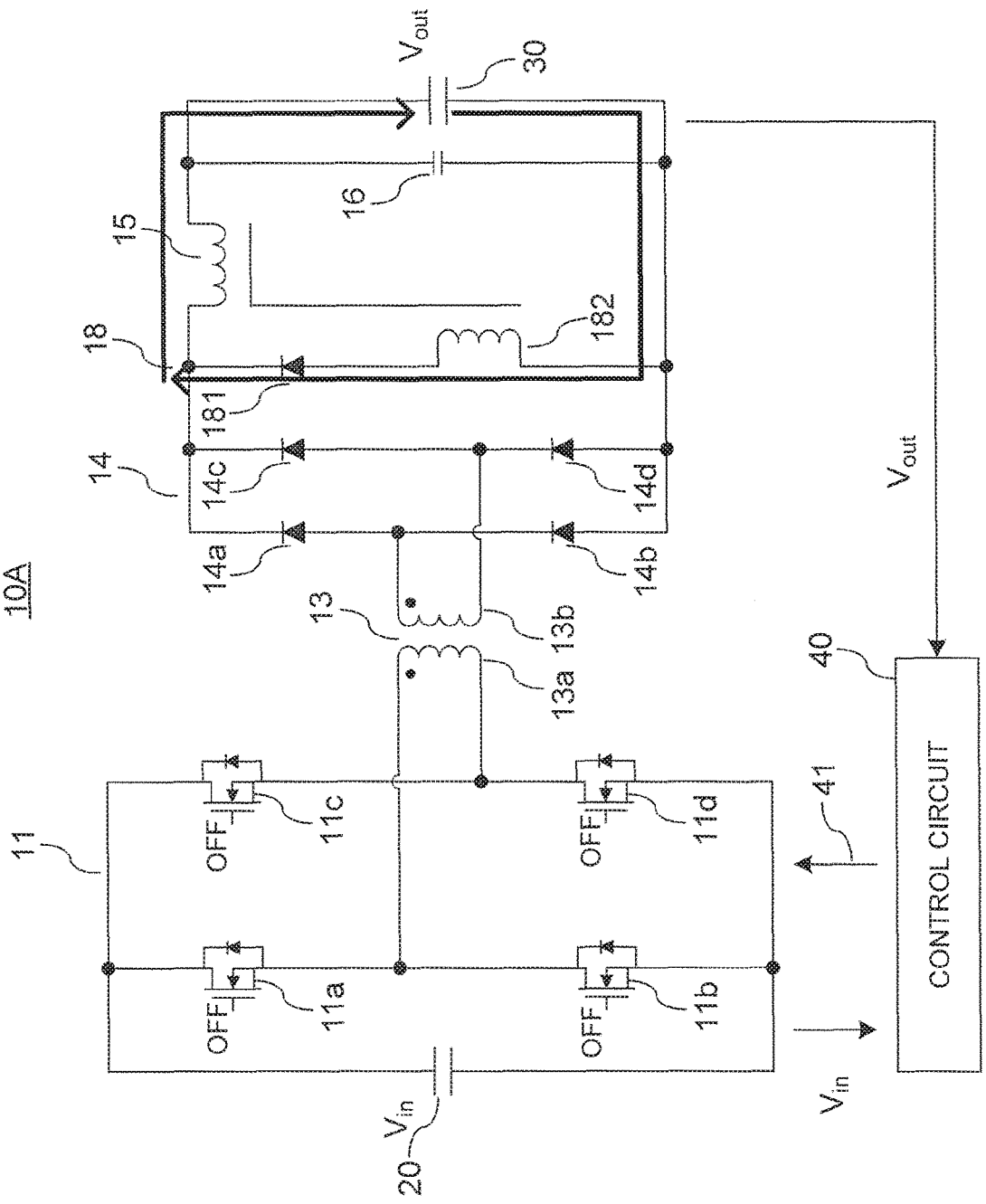
FIG. 14B is a current path diagram illustrating an operation of the DC/DC converter according to the second embodiment of this invention.
Figure 14C:
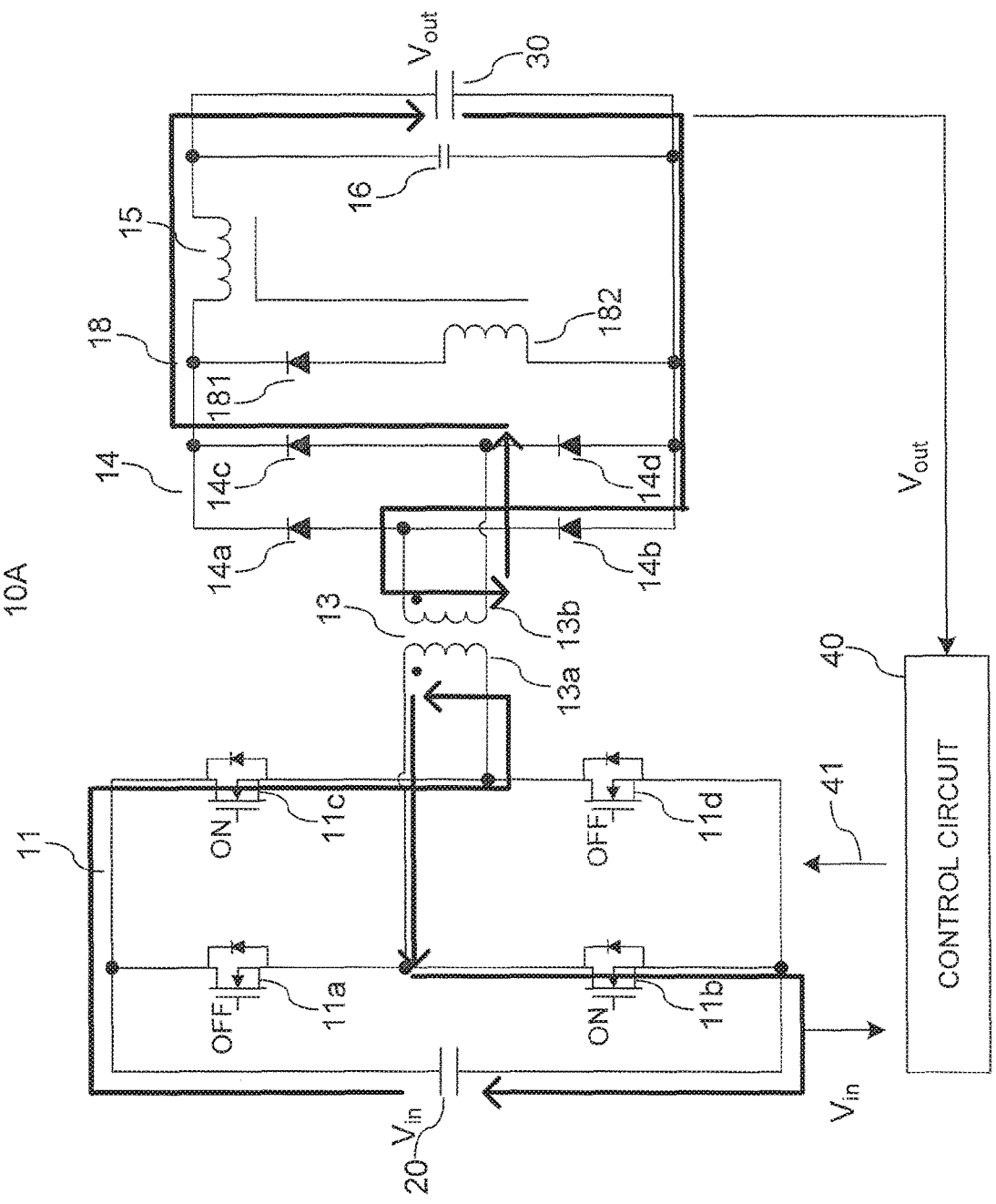
FIG. 14C is a current path diagram illustrating an operation of the DC/DC converter according to the second embodiment of this invention.

Next, currents flowing through the circuits at respective timings when switch control is implemented on the switching elements 11a to 11d in accordance with the gate signals 41, as shown in FIG. 13, will be described with reference to FIGS. 14A to 14C. FIGS. 14A to 14C are current path diagrams illustrating an operation of the DC/DC converter 10A according to the second embodiment of this invention.

In a period prior to a time t0, the gate signals 41 of the switching elements 11a, 11d are ON. On the primary side, therefore, as shown in FIG. 14A, a current flows along a path constituted by the DC power supply 20, the switching element 11a, the transformer primary side 13a, the switching element 11d, and the DC power supply 20. Further, on the secondary side, a current flows along a path constituted by the transformer secondary side 13b, the diode 14a, the smoothing reactor 15, the load 30, the diode 14d, and the transformer secondary side 13b. As a result, the current from the DC power supply 20 is supplied to the load 30.

At the time t0, the gate signals 41 of the switching elements 11a, 11d are switched OFF. In this case, a current no longer flows on the primary side, and therefore the respective drain-source voltages of the switching elements 11a to 11d reach Vin/2. Further, on the secondary side, as shown in FIG. 14B, no voltage is applied to the transformer primary side 13a, and therefore no voltage is generated in the transformer secondary side 13b either. Accordingly, the secondary side reflux diode 181 switches ON, whereby the voltage Vc shown above in Equation (1) is applied to the output side of the rectifier circuit 14.

Here, similarly to the first embodiment, a case in which the respective winding numbers N1, N2 are set such that Vc>0 will be considered. In this case, during a period extending from the time t0 to a time t1, a reverse voltage is applied to the rectifier circuit 14 such that the diodes 14a to 14d are switched OFF, and therefore a current no longer flows through the rectifier circuit 14. Further, on the secondary side, a current flows along a path constituted by the smoothing reactor 15, the load 30, the reflux reactor 182, the secondary side reflux diode 181, and the smoothing reactor 15.

Note that when the current stops flowing through the diodes 14a, 14d during the period extending from the time t0 to the time t1 such that the diodes 14a, 14d switch OFF, a recovery current is generated. In this case, however, only the voltage Vc is applied to the output side of the rectifier circuit 14. Therefore, by setting the voltage Vc to be sufficiently lower than the withstand voltage of the diodes 14a to 14d of the rectifier circuit 14, a surge caused by the effect of the recovery voltage does not pose a problem.

Hence, during the period in which the voltage of the DC power supply 20 is not applied to the transformer primary side 13a, the secondary side reflux circuit 18 diverts the load current so that the load current is returned to the load, and therefore the load current flowing through the rectifier circuit 14 is suppressed. In other words, the load current flows through the series circuit formed by connecting the reflux reactor 182 and the secondary side reflux diode 181 in series instead of flowing through the rectifier circuit 14. Accordingly, a surge is generated due to the effect of a recovery current from the secondary side reflux diode 181 alone, rather than the two diodes (i.e. the diodes 14a and 14d) on the reflux path of the rectifier circuit 14, and as a result, an overall reduction in the surge can be achieved.

At the time t1, the gate signals 41 of the switching elements 11b, 11c are switched ON. In this case, as shown in FIG. 14C, on the primary side, a current flows along a path constituted by the DC power supply 20, the switching element 11c, the transformer primary side 13a, the switching element 11b, and the DC power supply 20 during the period extending from the time t1 to a time t2. On the secondary side, a current flows along a path constituted by the transformer secondary side 13b, the diode 14c, the smoothing reactor 15, the load 30, the diode 14b, and the transformer secondary side 13b. As a result, the current from the DC power supply 20 is supplied to the load 30.

The period from the time t0 to the time t2, described above, is a half period, and during this half period, the switching elements 11a, 11d are switched OFF while the switching elements 11b, 11c are switched ON. The remaining half period is a period extending from the time t2 to a time t4, and during the remaining half period, similar control to that of the period extending from the time t0 to the time t2 is implemented such that the switching elements 11b, 11c are switched OFF and the switching elements 11a, 11d are switched ON. By implementing similar control repeatedly using the period extending from the time t0 to the time t4 as a single period, the load current is caused to flow continuously through the load 30.

According to the second embodiment, as described above, a configuration including the secondary side reflux circuit connected to the output side of the rectifier circuit in order to divert the load current flowing through the load during the period in which the voltage from the DC power supply is not applied to the primary side of the transformer is provided. Further, the series circuit formed by connecting the smoothing reactor and the load in series is connected to the output side of the rectifier circuit, and the secondary side reflux circuit is positioned between the output side of the rectifier circuit and the series circuit and connected in parallel to the series circuit.

Hence, surge generation due to the effect of the recovery voltage can be suppressed. Further, a snubber circuit is not provided, and therefore surge countermeasures on the secondary side including the snubber circuit and so on are not required. Moreover, loss occurring in the primary side semiconductor switching elements can be reduced. As a result, the DC/DC converter can be improved in efficiency and reduced in size.

Note that in the second embodiment, the secondary side of the DC/DC converter 10A is configured identically to the first embodiment, and therefore identical effects are obtained when the various modified examples disclosed in the first embodiment are applied thereto.

Furthermore, in the first and second embodiments, cases in which the rectifier circuit 14 is constituted by a full bridge type rectifier circuit were described, but a center tap type rectifier circuit may be used instead.

The invention claimed is:

1. A DC/DC converter comprising:
an inverter circuit including a plurality of inverter semiconductor switching elements subjected to switch control using a soft switching method, and converting DC power from a DC power supply connected to an input side thereof into AC power which is output to a load;
a rectifier circuit including a plurality of rectifying semiconductor switching elements;
a transformer connected on a primary side thereof to an output side of the inverter circuit, and on a secondary side thereof to an input side of the rectifier circuit;
a resonance reactor inserted between the output side of the inverter circuit and the primary side of the transformer;
a smoothing reactor connected to an output side of the rectifier circuit;
a secondary side reflux circuit connected to the output side of the rectifier circuit in order to divert a load current flowing through the load during a period in which a voltage from the DC power supply is not applied to the primary side of the transformer;
a first primary side reflux semiconductor switching element connected at one end to a connection point between the resonance reactor and the primary side of the transformer and at another end to one end of the DC power supply; and
a second primary side reflux semiconductor switching element connected at one end to another end of the DC power supply and at another end to the connection point between the resonance reactor and the primary side of the transformer,
wherein a series circuit formed by connecting the smoothing reactor and the load in series is connected to the output side of the rectifier circuit,
the secondary side reflux circuit is positioned between the output side of the rectifier circuit and the series circuit and connected in parallel to the series circuit,
either the first primary side reflux semiconductor switching element or the second primary side reflux semiconductor switching element diverts a current flowing through the resonance reactor during the period in which the voltage from the DC power supply is not applied to the primary side of the transformer,
the secondary side reflux circuit comprises a secondary side reflux semiconductor switching element, and
the first primary side reflux semiconductor switching element and the second primary side reflux semiconductor switching element are synchronized with the secondary side reflux semiconductor switching element, such that when the secondary side reflux semiconductor switching element is ON, the first primary side reflux semiconductor switching element is ON or the second primary side reflux semiconductor switching element is ON, in alternation.

2. The DC/DC converter according to claim 1, wherein the secondary side reflux circuit applies a positive voltage to the output side of the rectifier circuit during the period in which the voltage of the DC power supply is not applied to the primary side of the transformer.

3. The DC/DC converter according to claim 1, wherein the secondary side reflux circuit further comprises:
a reflux reactor that is connected in series to the secondary side reflux semiconductor switching element and magnetically coupled to the smoothing reactor.

4. The DC/DC converter according to claim 3, wherein a winding number of the reflux reactor is set such that when the voltage of the DC power supply is not applied to the primary side of the transformer, a positive voltage is applied to the output side of the rectifier circuit.

5. The DC/DC converter according to claim 3, wherein one end of the secondary side reflux semiconductor switching element is connected to one end of the reflux reactor,
another end of the secondary side reflux semiconductor switching element is connected to a positive side output terminal of the rectifier circuit, and
another end of the reflux reactor is connected to a negative side output terminal of the rectifier circuit.

6. The DC/DC converter according to claim 3, wherein one end of the secondary side reflux semiconductor switching element is connected to one end of the reflux reactor,
another end of the secondary side reflux semiconductor switching element is connected to a negative side output terminal of the rectifier circuit, and
another end of the reflux reactor is connected to a positive side output terminal of the rectifier circuit.

7. The DC/DC converter according to claim 3, wherein the smoothing reactor comprises:
a first smoothing reactor connected at one end to a positive side output terminal of the rectifier circuit and at another end to a positive side terminal of the load; and
a second smoothing reactor connected at one end to a negative side output terminal of the rectifier circuit and at another end to a negative side terminal of the load.

8. The DC/DC converter according to claim 7, wherein the first smoothing reactor is magnetically coupled to the second smoothing reactor.

9. The DC/DC converter according to claim 7, wherein the reflux reactor is magnetically coupled to the first smoothing reactor or the second smoothing reactor.

10. The DC/DC converter according to claim 7, wherein the reflux reactor comprises:
a first reflux reactor that is magnetically coupled to the first smoothing reactor; and
a second reflux reactor that is magnetically coupled to the second smoothing reactor.

11. The DC/DC converter according to claim 10, wherein the first smoothing reactor, the second smoothing reactor, the first reflux reactor, and the second reflux reactor are magnetically coupled.

12. The DC/DC converter according to claim 10, wherein the first reflux reactor is connected at one end to one end of the secondary side reflux semiconductor switching element and at another end to the positive side output terminal of the rectifier circuit, and
the second reflux reactor is connected at one end to another end of the secondary side reflux semiconductor switching element and at another end to the negative side output terminal of the rectifier circuit.

13. The DC/DC converter according to claim 1, wherein the secondary side reflux circuit further comprises:
a reflux capacitor, one end of which is connected in series to one end of the secondary side reflux semiconductor switching element; and
a bypass semiconductor switching element connected at one end to a connection point between the reflux capacitor and the secondary side reflux semiconductor switching element, and at another end to a connection point between the smoothing reactor and the load, and
wherein another end of the reflux capacitor is connected to a positive side output terminal of the rectifier circuit, and
another end of the secondary side reflux semiconductor switching element is connected to a negative side output terminal of the rectifier circuit.

14. The DC/DC converter according to claim 1, wherein the secondary side reflux semiconductor switching element has a characteristic according to which a size of a recovery current generated during switching is smaller than that of the plurality of rectifying semiconductor switching elements.

15. The DC/DC converter according to claim 1, wherein the secondary side reflux semiconductor switching element is configured using a diode or a transistor formed from a wide bandgap semiconductor.

16. A DC/DC converter comprising:
an inverter circuit including a plurality of inverter semiconductor switching elements subjected to switch control using a hard switching method, and converting DC power from a DC power supply connected to an input side thereof into AC power which is output to a load;
a rectifier circuit including a plurality of rectifying semiconductor switching elements;
a transformer connected on a primary side to an output side of the inverter circuit and connected on a secondary side to an input side of the rectifier circuit;
a smoothing reactor connected to an output side of the rectifier circuit; and
a secondary side reflux circuit connected to the output side of the rectifier circuit in order to divert a load current flowing through the load during a period in which a voltage from the DC power supply is not applied to the primary side of the transformer,
wherein a series circuit formed by connecting the smoothing reactor and the load in series is connected to the output side of the rectifier circuit, and
the secondary side reflux circuit is positioned between the output side of the rectifier circuit and the series circuit and connected in parallel to the series circuit,
wherein the secondary side reflux circuit comprises:
a secondary side reflux semiconductor switching element; and
a reflux reactor that is connected in series to the secondary side reflux semiconductor switching element and magnetically coupled to the smoothing reactor.

17. The DC/DC converter according to claim 16, wherein the secondary side reflux circuit applies a positive voltage to the output side of the rectifier circuit during the period in which the voltage of the DC power supply is not applied to the primary side of the transformer.

18. The DC/DC converter according to claim 16, wherein a winding number of the reflux reactor is set such that when the voltage of the DC power supply is not applied to the primary side of the transformer, a positive voltage is applied to the output side of the rectifier circuit.

19. The DC/DC converter according to claim 16, wherein the secondary side reflux circuit is configured such that one end of the secondary side reflux semiconductor switching element is connected to one end of the reflux reactor, another end of the secondary side reflux semiconductor switching element is connected to a positive side output terminal of the rectifier circuit, and another end of the reflux reactor is connected to a negative side output terminal of the rectifier circuit.

20. The DC/DC converter according to claim 16, wherein the secondary side reflux circuit is configured such that one end of the secondary side reflux semiconductor switching element is connected to one end of the reflux reactor, another end of the secondary side reflux semiconductor switching element is connected to a negative side output terminal of the rectifier circuit, and another end of the reflux reactor is connected to a positive side output terminal of the rectifier circuit.

21. The DC/DC converter according to claim 16, wherein the smoothing reactor comprises:

a first smoothing reactor connected at one end to a positive side output terminal of the rectifier circuit and at another end to a positive side terminal of the load; and a second smoothing reactor connected at one end to a negative side output terminal of the rectifier circuit and at another end to a negative side terminal of the load.

22. The DC/DC converter according to claim 21, wherein the first smoothing reactor is magnetically coupled to the second smoothing reactor.

23. The DC/DC converter according to claim 21, wherein the reflux reactor is magnetically coupled to the first smoothing reactor or the second smoothing reactor.

24. The DC/DC converter according to claim 21, wherein the reflux reactor comprises:

a first reflux reactor that is magnetically coupled to the first smoothing reactor; and a second reflux reactor that is magnetically coupled to the second smoothing reactor.

25. The DC/DC converter according to claim 24, wherein the first smoothing reactor, the second smoothing reactor, the first reflux reactor, and the second reflux reactor are magnetically coupled.

26. The DC/DC converter according to claim 24, wherein the first reflux reactor is connected at one end to one end of the secondary side reflux semiconductor switching element and at another end to the positive side output terminal of the rectifier circuit, and the second reflux reactor is connected at one end to another end of the secondary side reflux semiconductor switching element and at another end to the negative side output terminal of the rectifier circuit.

27. The DC/DC converter according to claim 16, wherein the secondary side reflux semiconductor switching element has a characteristic according to which a size of a recovery current generated during switching is smaller than that of the plurality of rectifying semiconductor switching elements.

28. The DC/DC converter according to claim 16, wherein the secondary side reflux semiconductor switching element is configured using a diode or a transistor formed from a wide bandgap semiconductor.

* * * * *